(12) United States Patent
Belanger et al.

(10) Patent No.: US 12,265,025 B2
(45) Date of Patent: Apr. 1, 2025

(54) SYSTEM AND METHOD FOR MEASURING A REFRACTIVE INDEX OF A MEDIUM

(71) Applicant: UNIVERSITÉ LAVAL, Québec (CA)

(72) Inventors: Érik Belanger, Québec (CA); Pierre Marquet, Stoneham-et-Tewkesbury (CA); Bertrand De Dorlodot, Québec (CA); Réal Vallée, Québec (CA)

(73) Assignee: UNIVERSITÉ LAVAL, Quebec (CA)

( * ) Notice: Subject to any disclaimer, the term of this patent is extended or adjusted under 35 U.S.C. 154(b) by 241 days.

(21) Appl. No.: 17/424,919

(22) PCT Filed: Jan. 30, 2020

(86) PCT No.: PCT/CA2020/050113
§ 371 (c)(1),
(2) Date: Jul. 22, 2021

(87) PCT Pub. No.: WO2020/154812
PCT Pub. Date: Aug. 6, 2020

(65) Prior Publication Data
US 2022/0091033 A1    Mar. 24, 2022

Related U.S. Application Data

(60) Provisional application No. 62/799,819, filed on Feb. 1, 2019.

(51) Int. Cl.
*G01N 21/45* (2006.01)
*G01M 11/02* (2006.01)

(52) U.S. Cl.
CPC ....... *G01N 21/453* (2013.01); *G01M 11/0228* (2013.01)

(58) Field of Classification Search
CPC .................. G01M 11/0228; G01N 21/453
See application file for complete search history.

(56) References Cited

U.S. PATENT DOCUMENTS

| 5,151,752 | A | 9/1992 | Oono et al. |
| 6,262,818 | B1 | 7/2001 | Cuche et al. |

(Continued)

OTHER PUBLICATIONS

Barone-Nugent, E. D., A. N. T. O. N. Barty, and K. A. Nugent. "Quantitative phase-amplitude microscopy I: optical microscopy." Journal of microscopy 206.3 (2002): 194-203.

(Continued)

*Primary Examiner* — Violeta A Prieto
(74) *Attorney, Agent, or Firm* — Reno Lessard; Norton Rose Fulbright Canada LLP

(57) ABSTRACT

There is described a method for determining a refractive index of a medium. The method generally has providing a substrate having a surface, the surface having a first surface portion and a second surface portion spaced-apart from the first surface portion and recessed of a depth relative to the first surface portion; receiving the medium at least on the second surface portion; propagating a first optical beam towards the first surface portion and a second optical beam towards the second surface portion; collecting the first and second optical beams after said propagating and generating first and second signals being indicative of a phase of a respective one of the first and second collected optical beams; and determining a refractive index of said medium based on the first and second signals, the depth, a wavelength associated to the first and second optical beams and a refractive index of the substrate.

16 Claims, 13 Drawing Sheets

(56) References Cited

U.S. PATENT DOCUMENTS

| | | | |
|---|---|---|---|
| 6,642,046 B1* | 11/2003 | McGarry | G01N 30/6069 |
| | | | 435/305.3 |
| 6,943,924 B2 | 9/2005 | Marquet et al. | |
| 7,119,905 B2 | 10/2006 | Bingham et al. | |
| 2002/0183844 A1* | 12/2002 | Fishman | A61L 27/3604 |
| | | | 623/4.1 |
| 2004/0043479 A1* | 3/2004 | Briscoe | G01N 30/6095 |
| | | | 435/288.5 |
| 2005/0036181 A1* | 2/2005 | Marquet | G03H 1/0443 |
| | | | 359/15 |
| 2016/0153901 A1* | 6/2016 | Sugimoto | G01M 11/0228 |
| | | | 356/517 |
| 2017/0205222 A1* | 7/2017 | Mathuis | G01N 15/14 |
| 2021/0240134 A1* | 8/2021 | Kim | G03H 1/0402 |

OTHER PUBLICATIONS

Bon, Pierre, et al. "Quadriwave lateral shearing interferometry for quantitative phase microscopy of living cells." Optics express 17.15 (2009): 13080-13094.

Cotte, Yann, et al. "Marker-free phase nanoscopy." Nature Photonics 7.2 (2013): 113-117.

Nguyen, Tan H., et al. "Gradient light interference microscopy for 3D imaging of unlabeled specimens." Nature communications 8.1 (2017): 1-9.

Popescu, Gabriel, et al. "Diffraction phase microscopy for quantifying cell structure and dynamics." Optics letters 31.6 (2006): 775-777.

Kim, Youngchan, et al. "Common-path diffraction optical tomography for investigation of three-dimensional structures and dynamics of biological cells." Optics express 22.9 (2014): 10398-10407.

Choi, Wonshik, et al. "Tomographic phase microscopy." Nature methods 4.9 (2007): 717-719.

Maisenholder et al: "A GaAs/AlGaAs-based refractometer platform for integrated optical sensing applications", Sensors and Actuators B: Chemical, Elsevier BV, NL, vol. 39, No. 1-3, Mar. 1, 1997 (Mar. 1, 1997), pp. 324-329.

Bjorn Kemper et al: "Integral refractive index determination of living suspension cells by multifocus digital holographie phase contrast microscopy", Journal of Biomedical Optics, vol. 12, No. 5, Jan. 1, 2007 (Jan. 1, 2007), p. 054009.

\* cited by examiner

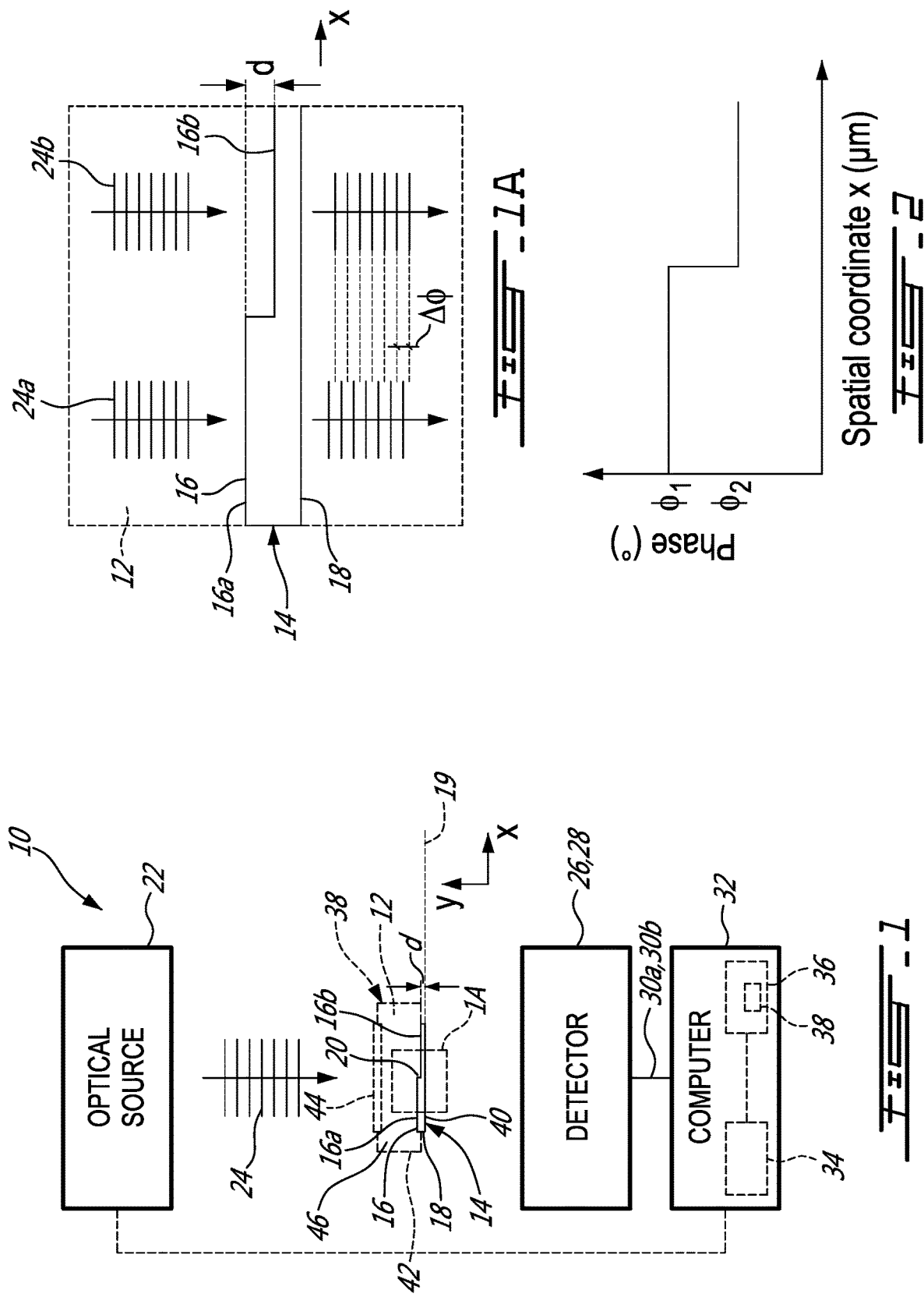

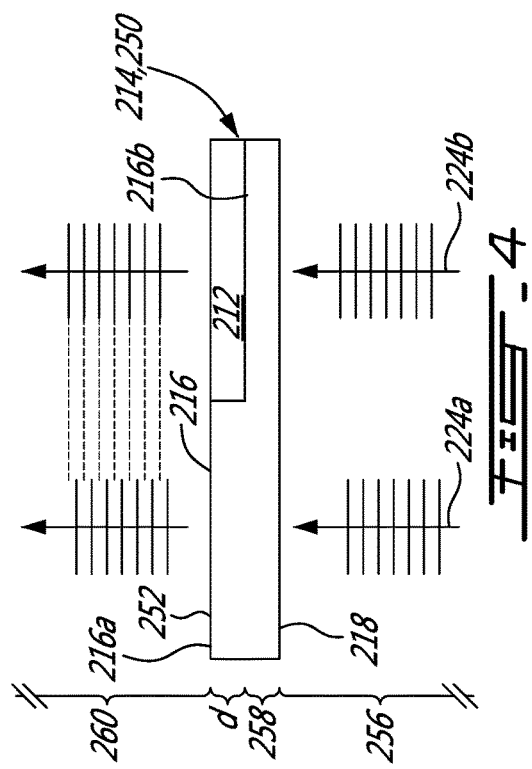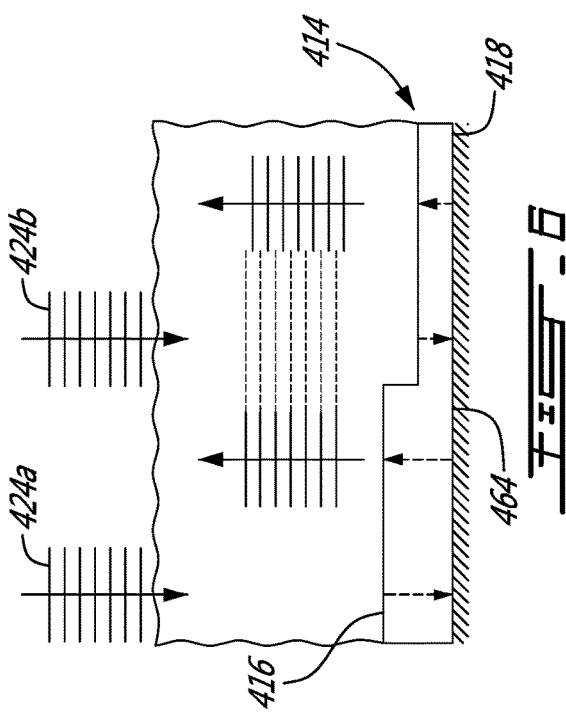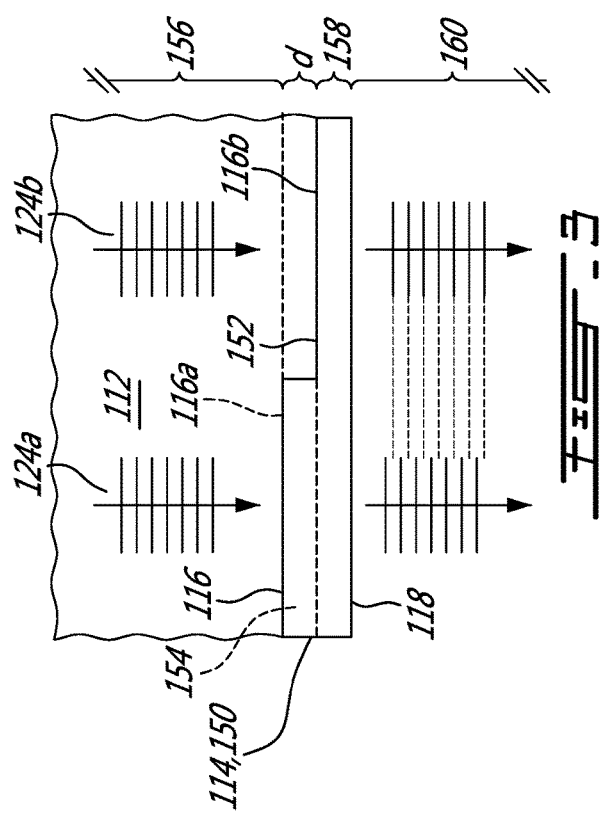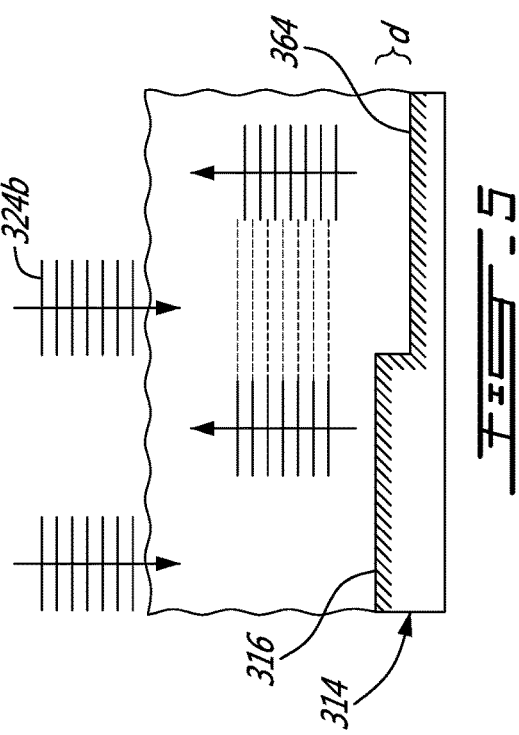

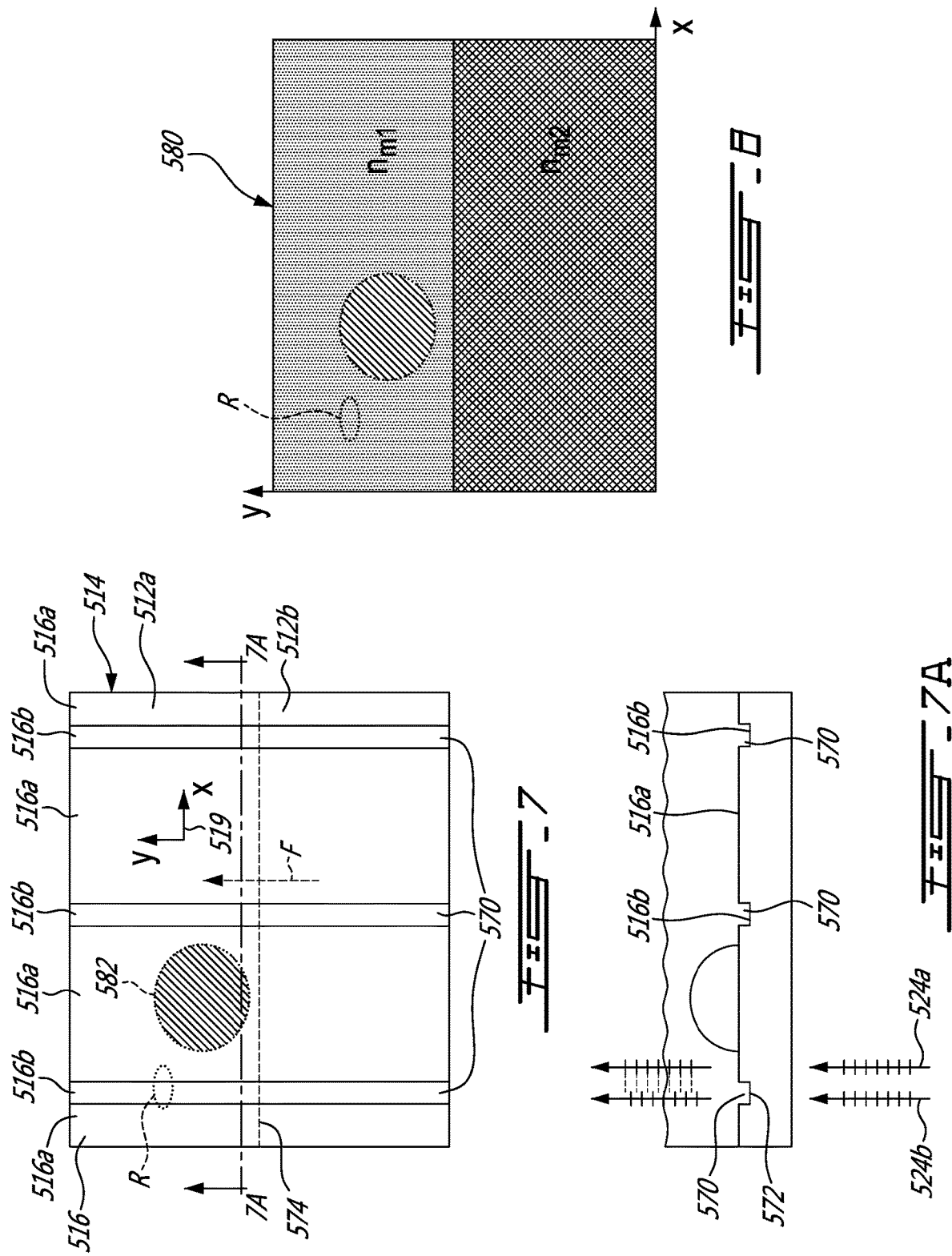

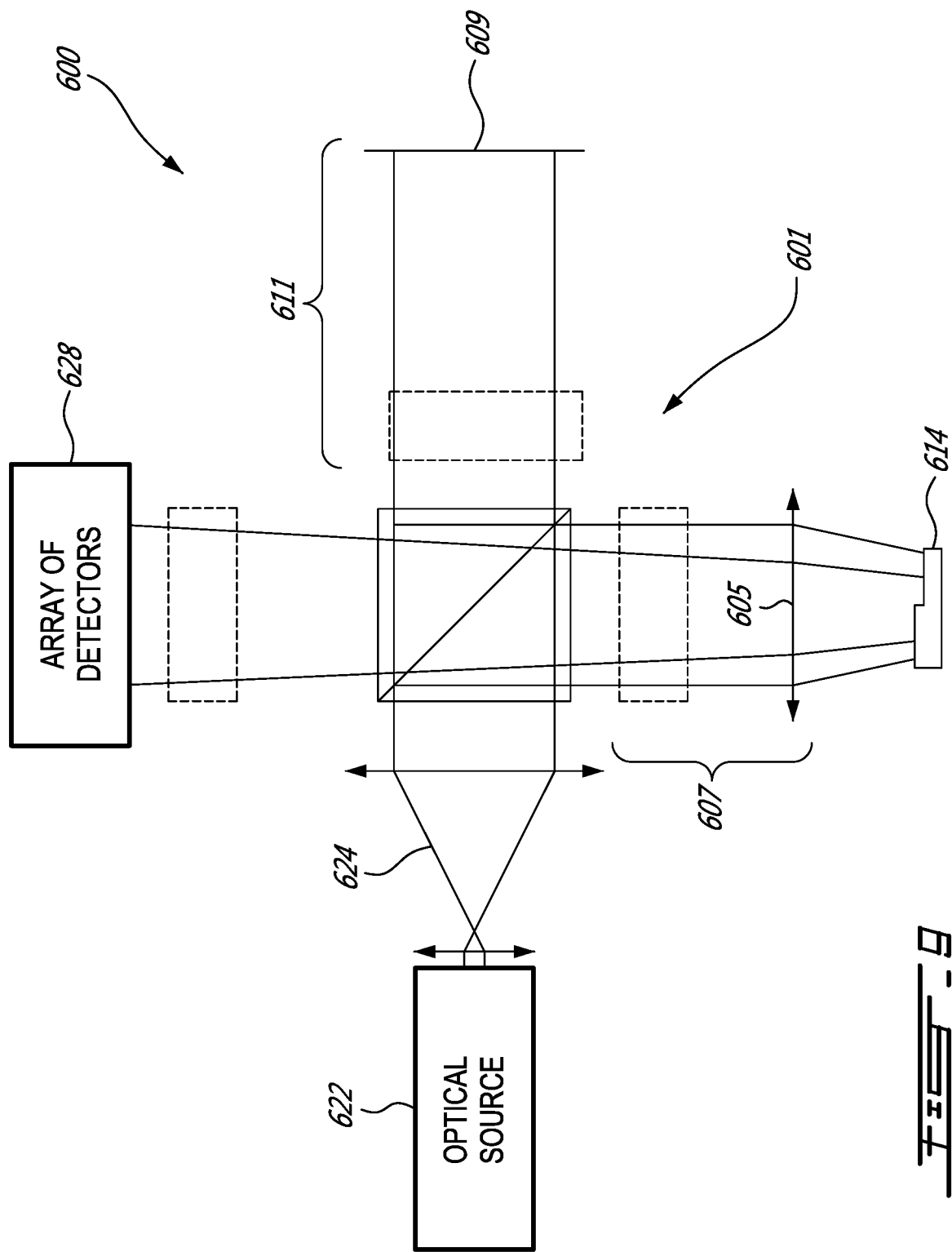

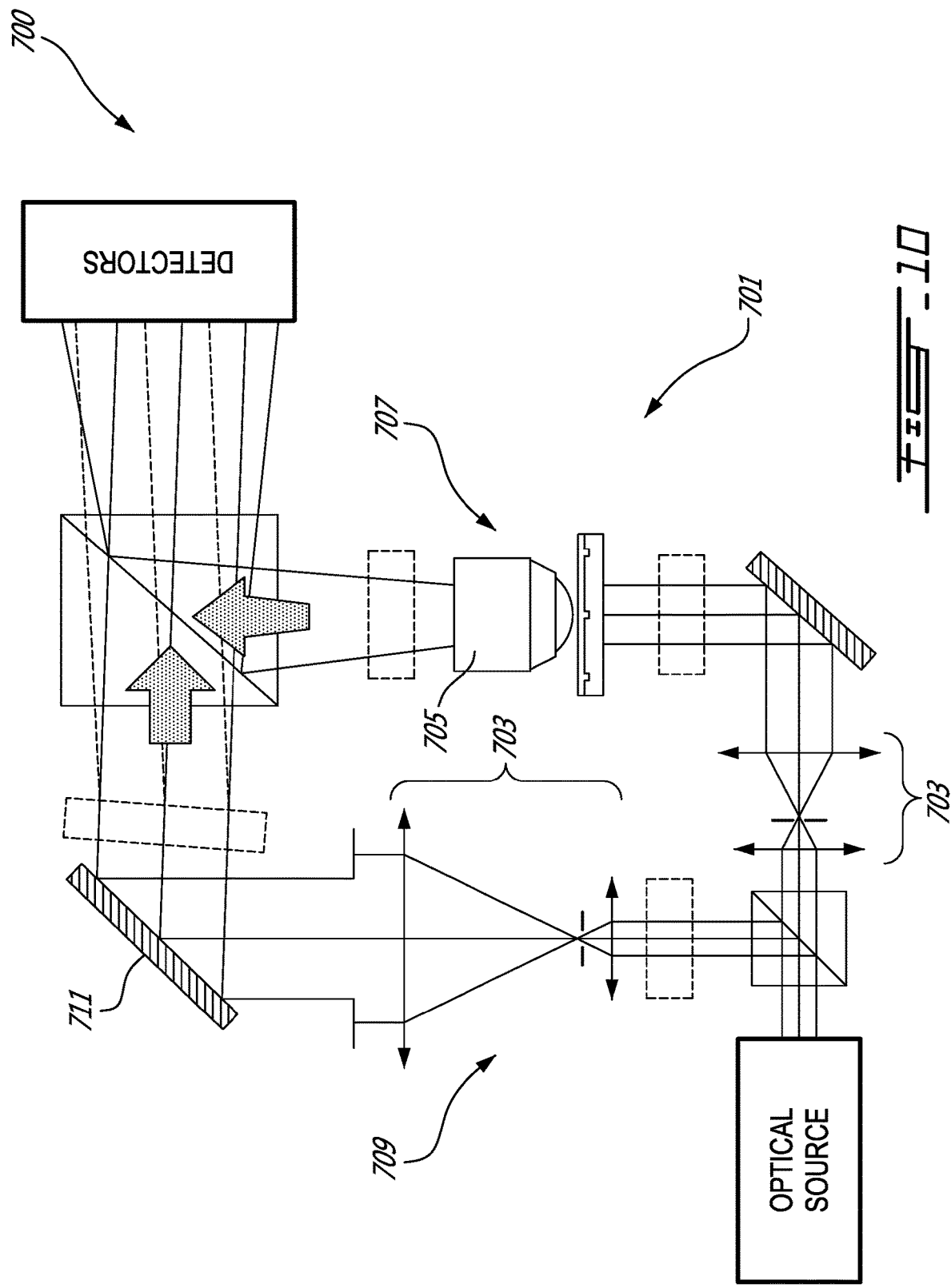

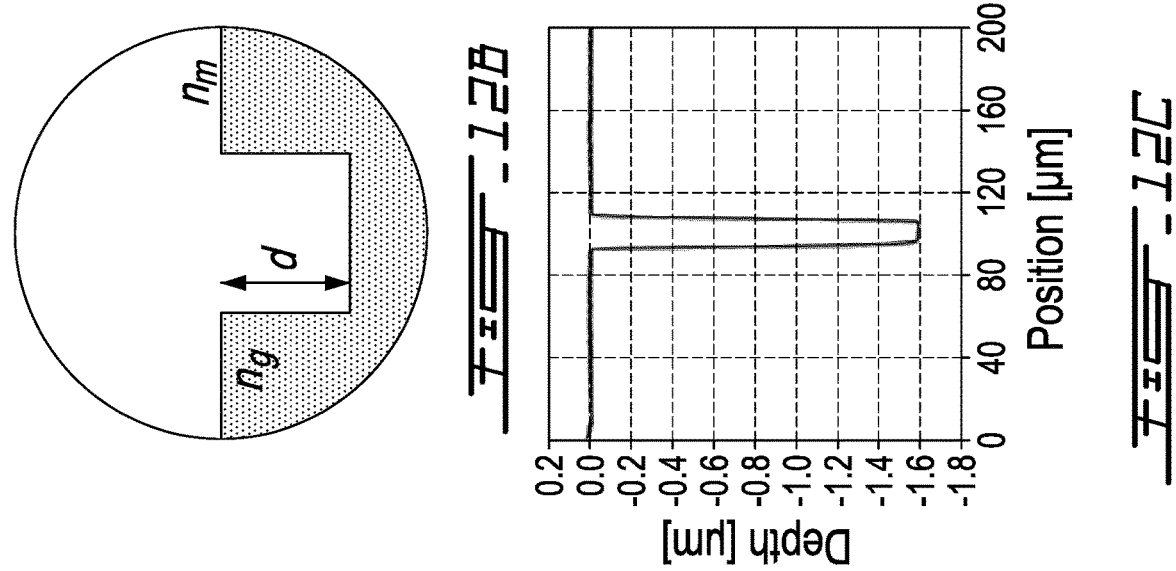
FIG. 12B
FIG. 12C
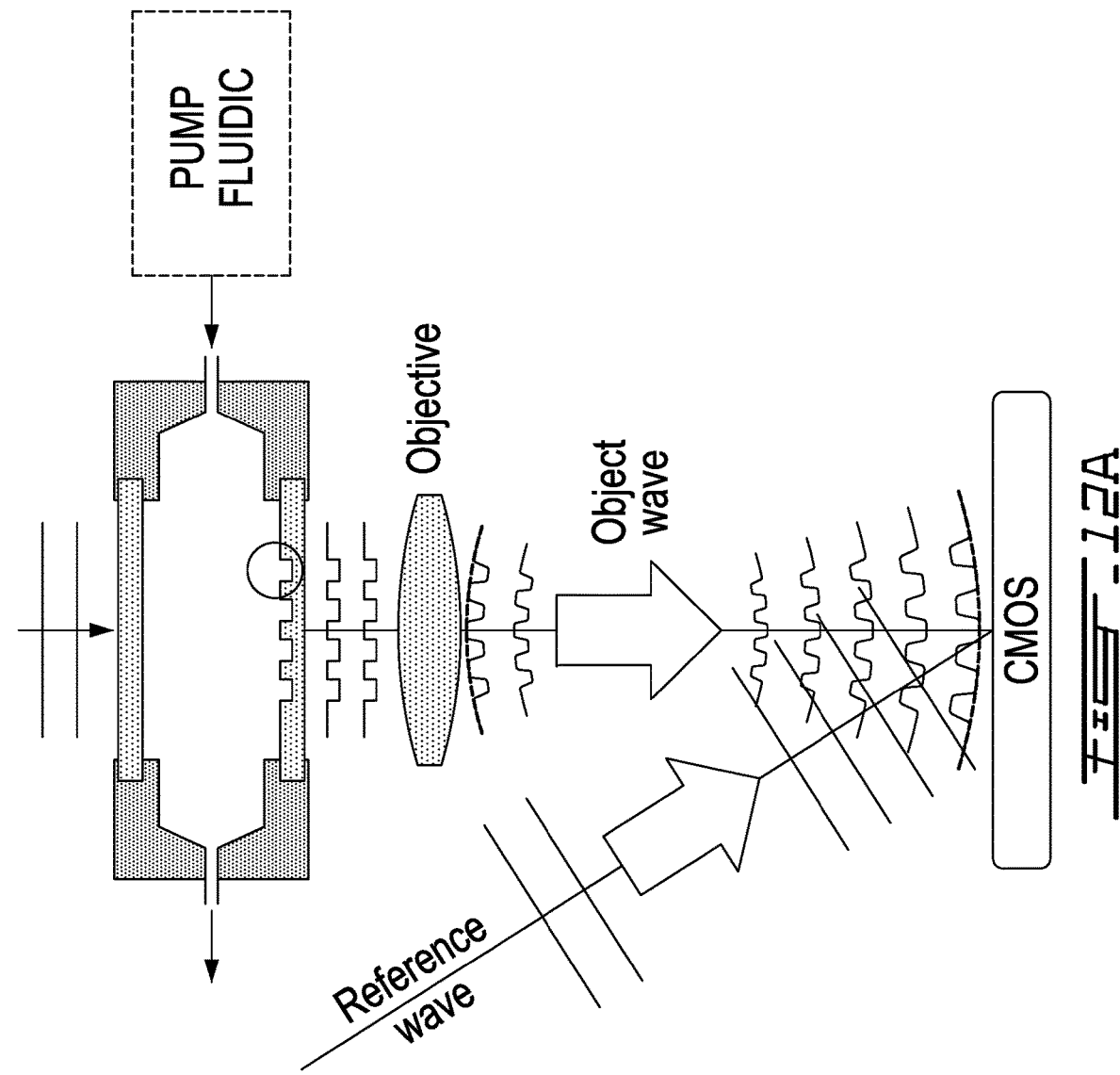
FIG. 12A

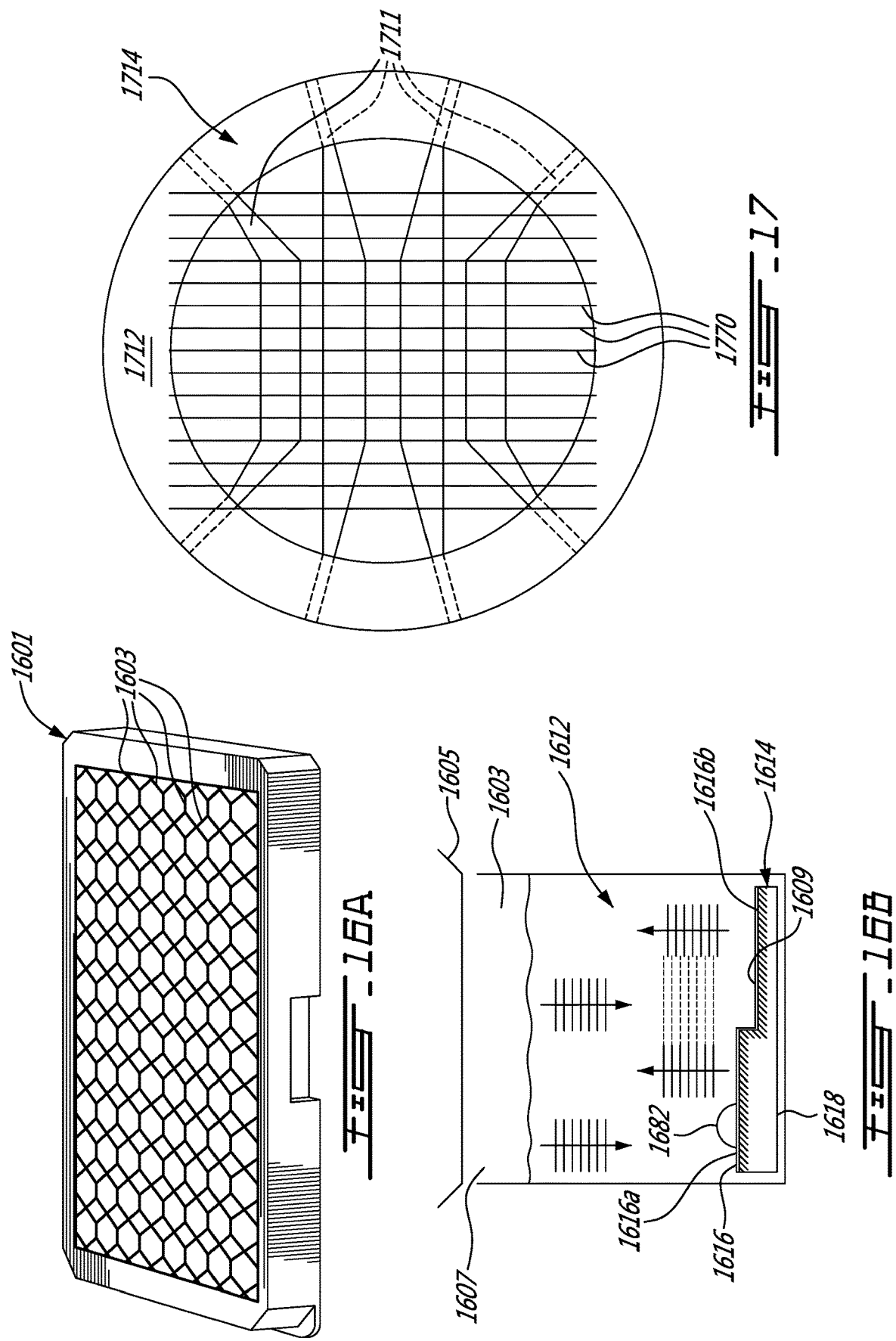

SYSTEM AND METHOD FOR MEASURING A REFRACTIVE INDEX OF A MEDIUM

FIELD

The improvements generally relate to the determination of a refractive index of a medium received on a substrate and more specifically relates to such determination using optical signals.

BACKGROUND

Characterizing a medium by measuring its refractive index is pursued in many fields such as in digital holographic microscopy (DHM), a technique typically used to image biological samples or other materials. As opposed to conventional microscopy techniques, which generally record a projected image of the biological sample, DHM techniques rather retrieve phase delays of a light wave front originating from the sample under examination. The phase delays are generally encoded in the form of a hologram from which a quantitative phase image of the biological sample can be reconstructed thereafter. When examining such biological samples, which generally include cells immersed in a surrounding medium, meaningful reconstruction of the quantitative phase image of the cells generally requires the refractive index of the surrounding medium to be precisely known. To do so, it is generally known to measure the refractive index of the surrounding medium using an Abbe refractometer, a standalone state-of-the-art apparatus generally used for measuring refractive indexes of such media, prior to the immersion of the cells into the surrounding medium.

Although existing apparatuses for measuring a refractive index of a medium are satisfactory to a certain degree, there remains room for improvement.

SUMMARY

Drawbacks associated to the use of the Abbe refractometer for the measurement of the refractive index $n_m$ of a given medium exist, especially when the given medium is to immerse cells for later imaging using a DHM system. For instance, as the refractive index $n_m$ of the medium depends on the wavelength at which it is measured, there can be significant discrepancies between a refractive index $n_{m,Abbe}$ of the medium as measured at an operating wavelength $\lambda_{Abbe}$ of the Abbe refractometer and a refractive index $n_{m,DHM}$ of the medium as measured at an operating wavelength $\lambda_{DHM}$ of a DHM system. Moreover, an instantaneous refractive index $n_{m,i}$ can differ from the moment in time where it is measured using the Abbe refractometer, prior to immersion of the cells into the surrounding medium, and the moment in time where the medium is measured using the DHM system, in which the medium actually surrounds the cells. Further, the refractive index $n_m$ of the medium surrounding the cells on the substrate may not be spatially homogenous.

Accordingly, there remains a need in the industry towards a system for measuring the refractive index $n_m$ of the medium which can operate at the operating wavelength $\lambda_{DHM}$ of the DHM system; measuring the refractive index $n_m$ of the medium as the medium surrounds the cells in an in situ experimental setup; provide localized measurements of the refractive index $n_m$ of the medium so as to provide a refractive index map which maps variations in the refractive index $n_m$ of the medium as function of the coordinates of a substrate on which it is received; and provide real time or quasi real time measurements of the refractive index $n_m$ of the medium.

There are described methods and systems for measuring a refractive index $n_m$ of a medium which aim at alleviating at least some of the aforementioned drawbacks, especially in addressing the spectral, temporal and/or spatially drawbacks identified above.

In accordance with a first aspect of the present disclosure, there is provided a method for determining a refractive index of a medium, the method comprising: providing a substrate having a first surface opposite to a second surface, the first surface having a first surface portion and a second surface portion spaced-apart from the first surface portion and recessed of a given depth relative to the first surface portion; receiving the medium at least on the second surface portion; propagating a first optical beam towards the first surface portion and a second optical beam towards the second surface portion, the first and second optical beams having power within a spectral band at a given wavelength; collecting the first and second optical beams after said propagating and generating first and second signals being indicative of a phase of a respective one of the first and second collected optical beams; and determining a refractive index of said medium based on the first and second signals, the given depth, the given wavelength and a refractive index of the substrate. In some embodiments, the method has a step of determining a temporal variation of the refractive index of the medium. In other embodiments, the method has a step of determining a spatial variation of the refractive index of the medium. In alternate embodiments, the method has a step of determining a spectral variation of the refractive index of the medium. Of course, in some specific embodiments, the method has a step of determining at least one of a spatial variation, a temporal variation and a spectral variation of the refractive index of the medium.

Further in accordance with the first aspect of the present disclosure, the medium can for example surround a biological sample received on the first surface of the substrate, the method can for example comprise determining at least one of a refractive index and a geometry of the biological sample based on the previously determined refractive index of the medium surrounding the biological sample.

Still further in accordance with the first aspect of the present disclosure, the method can for example comprise depositing a coating layer on the first surface of the substrate, the coating layer being made of a biologically-compatible material, the biological sample being indirectly received on the first surface of the substrate via the coating layer.

Still further in accordance with the first aspect of the present disclosure, the first and second optical beams can for example be portions of a same optical beam.

Still further in accordance with the first aspect of the present disclosure, said first and second optical beams can for example be propagated through the substrate prior to said collecting.

Still further in accordance with the first aspect of the present disclosure, the first and second optical beams can for example be in phase relative to one another prior to reaching said substrate.

Still further in accordance with the first aspect of the present disclosure, the first and second optical beams can for example be orthogonal to the substrate.

Still further in accordance with the first aspect of the present disclosure, the method can for example comprise associating the determined refractive index of the medium to coordinates of the substrate.

Still further in accordance with the first aspect of the present disclosure, the method can for example comprise repeating the method in accordance with the first aspect for a plurality of other surface portions of the first surface of the substrate, thereby associating a plurality of determined refractive indexes to respective coordinates of the substrate to form a refractive index map.

Still further in accordance with the first aspect of the present disclosure, said collecting can for example comprise collecting a reference beam simultaneously to said first and second optical beams, said first and second signals each being indicative of an intensity of an interference between the reference beam and a respective one of the first and second collected optical beams at corresponding ones of the detectors of the array.

Still further in accordance with the first aspect of the present disclosure, said medium can for example be a fluid medium, in which case said receiving can for example comprise flowing said medium on the first and second surface portions of the substrate while performing said method.

In accordance with a second aspect of the present disclosure, there is provided a system for determining a refractive index of a medium, the system comprising: a substrate having a first surface opposite to a second surface, the first surface having a first surface portion and a second surface portion spaced-apart from the first surface portion and recessed of a given depth relative to the first surface portion, at least the second surface portion receiving the medium; an optical source propagating a first optical beam towards the first surface portion, and a second optical beam towards the second surface portion, the first and second optical beams having power within a spectral band at a given wavelength; a detector collecting the first and second optical beams after said propagating and generating first and second signals being indicative of a phase of a respective one of the first and second collected optical beams; and a computer determining a refractive index of said medium based on the first and second signals, the given depth, the given wavelength and a refractive index of the substrate.

Further in accordance with the second aspect of the present disclosure, the substrate can for example be a coverslip, in which the second surface portion can for example be recessed from an original surface of the coverslip.

Still further in accordance with the second aspect of the present disclosure, the system can for example comprise an enclosure having an optically transparent base, a plurality of lateral walls extending from the optically transparent base towards an optically transparent top, and a sealed cavity within the enclosure, the medium being received in the cavity, the substrate being made integral to at least one of the optically transparent base and the optically transparent top of the enclosure, the second surface portion facing towards the sealed cavity.

Still further in accordance with the second aspect of the present disclosure, the enclosure can for example have an input port and an output port, the system further comprises a pump flowing the medium into and out of the cavity via said input and output ports.

Still further in accordance with the second aspect of the present disclosure, the system can for example be provided in the form of a digital holographic microscopy system.

In accordance with a third aspect of the present disclosure, there is provided a substrate for use in determining a refractive index of a medium, the substrate comprising a first surface opposite to a second surface, the first surface having a first surface portion and a second surface portion spaced-apart from the first surface portion and recessed of a given depth relative to the first surface portion, wherein, during use, at least the second surface portion receives the medium, the first surface portion receives a first optical beam and the second surface portion receives a second optical beam, the first and second optical having power within a spectral band at a given wavelength $\lambda$, the depth d being given by a relation equivalent to the following relation: $d \geq \lambda/1.21$, wherein d denotes the given depth and $\lambda$ denotes the wavelength of the first and second optical beams expressed in nanometers.

Further in accordance with the third aspect, the given depth d can for example be given by a relation equivalent to the following relation: $d \geq \lambda/0.74$, the refractive index being determinable with a precision of at least 0.0006.

Still further in accordance with the third aspect, the given depth d can for example be given by a relation equivalent to the following relation: $d \geq \lambda/0.41$, the refractive index being determinable with a precision of at least 0.0003.

Still further in accordance with the third aspect, the first and second surface portions can for example be part of a groove recessed in the first surface of the substrate.

Still further in accordance with the third aspect, the substrate can for example comprise a coating layer on the first surface of the substrate.

Still further in accordance with the third aspect, the coating layer can for example be made of a biologically-compatible material.

Many further features and combinations thereof concerning the present improvements will appear to those skilled in the art following a reading of the instant disclosure.

DESCRIPTION OF THE FIGURES

In the figures,

FIG. 1 is a schematic view of an example of a system for measuring a refractive index of a medium received on a substrate, in accordance with an embodiment;

FIG. 1A is an enlarged view of the inset 1A of FIG. 1;

FIG. 2 is a graph showing phase versus a spatial coordinate as generated by the system of FIG. 1;

FIG. 3 is a schematic view of an example of a substrate having a first surface with a step delimiting two surface portions, showing two optical beams propagating through the two surface portions, respectively, as medium is received on both the two surface portions, in accordance with an embodiment;

FIG. 4 is a schematic view of an example of a substrate having a first surface with a step delimiting two surface portions, showing two optical beams propagating through the two surface portions, respectively, as medium is received only on one of the two surface portions, in accordance with an embodiment;

FIG. 5 is a schematic view of an example of a substrate having a first surface with a step delimiting two surface portions, showing two optical beams propagating towards the two surface portions, respectively, and then away from the first surface upon reflection on the first surface, in accordance with an embodiment;

FIG. 6 is a schematic view of an example of a substrate having a first surface with a step delimiting two surface portions, showing two optical beams propagating towards the two surface portions, respectively, and then away from the first surface upon reflection on both the first surface and on the opposite, second surface of the substrate, in accordance with an embodiment;

FIG. 7 is a top plan view of an example of a substrate having a first surface with a series of parallel grooves recessed from the first surface of the substrate and receiving media, in accordance with an embodiment;

FIG. 7A is a sectional view of the substrate of FIG. 7, taken along section 7A-7A of FIG. 7;

FIG. 8 is a refractive index map showing refractive indexes of the media of FIG. 7 as function of spatial coordinates (x,y) of the substrate of FIG. 7, as measured at a given moment in time;

FIGS. 9, 10 and 11 are examples of DHM systems, in accordance with some embodiments;

FIG. 12A is an example of a system for measuring a refractive index of a medium received on a substrate having a series of spaced-apart grooves recessed on a surface thereof, showing a fluidic pump flowing medium on the substrate, in accordance with an embodiment;

FIG. 12B is an enlarged view of one of the grooves of FIG. 12A, in accordance with an embodiment;

FIG. 12C is a graph showing depth as function of position for the groove of FIG. 12A, in accordance with an embodiment;

FIG. 16A is an oblique view of an example of a microwell plate having wells recessed therein, in accordance with an embodiment;

FIG. 16B is a cross-sectional view of one of the wells of the microwell plate of FIG. 16A, shown with a substrate received therein, in accordance with an embodiment; and FIG. 17 is a top plan view of an example of a flow chamber having microfluidic channels and grooves, in accordance with an embodiment.

DETAILED DESCRIPTION

Figure 11:
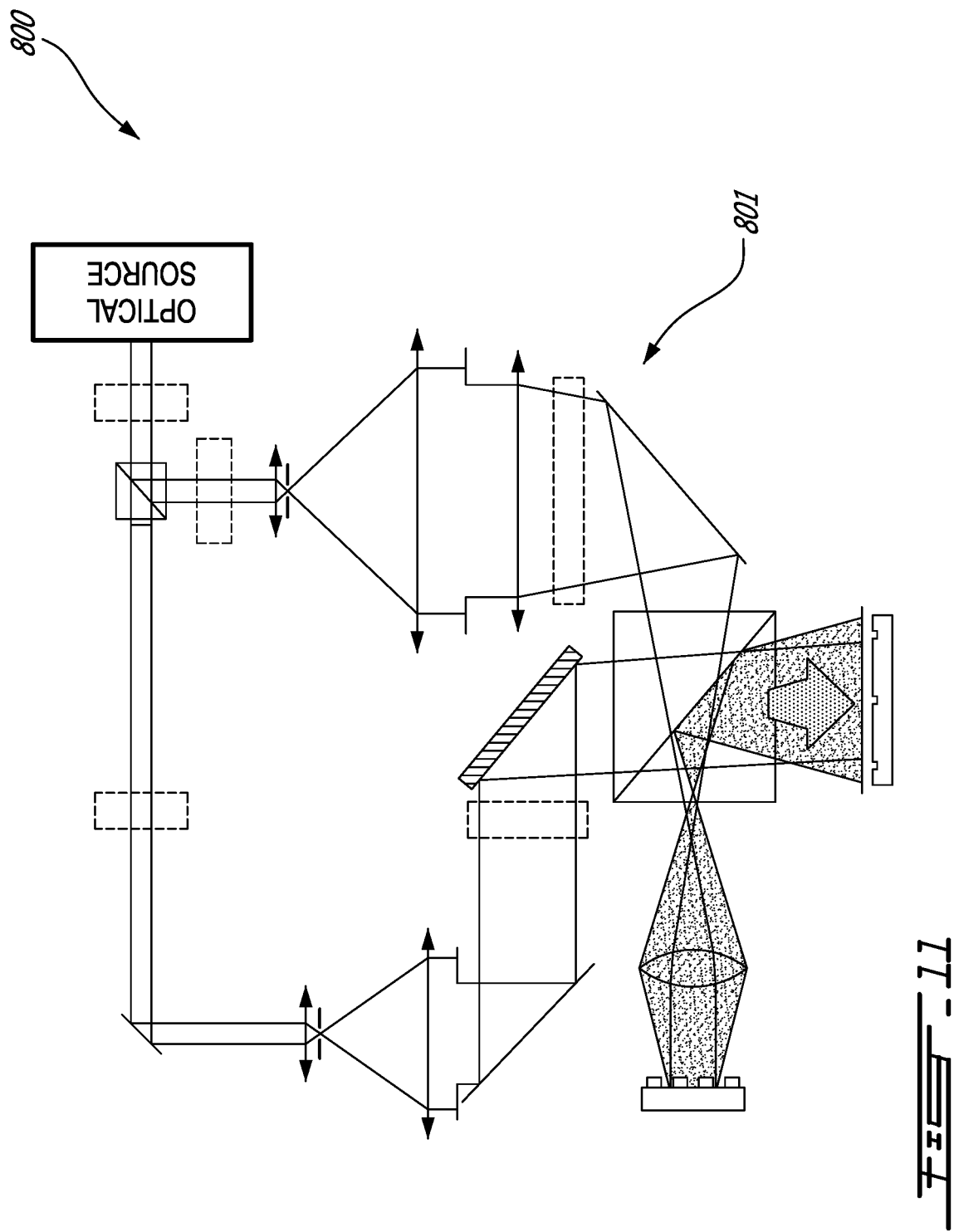

FIG. 1 shows an example of a system 10 for determining a refractive index (RI) of a medium 12, in accordance with an embodiment. The medium 12 can be fluid. For instance, the medium 12 can be a gaseous medium such as air in some embodiments, whereas the medium 12 can be a liquid medium such as water in some other embodiments.

As shown, the system 10 has a substrate 14 with a first surface 16 opposite to a second surface 18. The first surface 16 has a first surface portion 16a and a second surface portion 16b spaced-apart from the first surface portion 16a and recessed of a given depth d relative to the first surface portion 16a. In this specific example, the first surface 16 of the substrate 14 is planar, and the accordingly the first and second surface portions 16a and 16b are spaced-apart from one another along a plane 19 of the substrate 14.

As shown in this specific example, the first and second surface portions 16a and 16b are spaced from one another by a step 20 extending along the y-axis. Although not shown, the step 20 extends linearly across the page, thus yielding a rectangular shape to the first and second surface portions 16a and 16b. However, in other embodiments, the step 20 can extend in a curvilinear fashion to provide other shapes for the first and second surface portions 16a and 16b. For instance, the first or second surface portion 16a, 16b can have a circular shape, a triangular shape, a rectangular shape, a parabolic shape, a shape which would minimize or otherwise reduce optical diffraction, or any other suitable shape.

As shown in this example, the medium 12 is received on both the first and second surface portions 16a and 16b. However, in alternate embodiments, the medium 12 can be received only on the second surface portion 16b, an example of which will be described with reference to FIG. 4.

The system 10 has an optical source 22 simultaneously propagating a first optical beam towards the first surface portion 16a, and a second optical beam towards the second surface portion. Both the first and second optical beams have power within a spectral band at a given free-space wavelength $\lambda_0$.

In this example, both the first and second optical beams are portions of a main optical beam 24 propagated by a single optical source 22. A portion of the main optical beam 24 which is propagated towards the first surface portion 16a acts as the first optical beam, whereas the portion of the main optical beam 24 which is propagated towards the second surface portion 16b acts as the second optical beam. As best shown in FIG. 1A, the main optical beam 24 has a first optical beam 24a propagated towards the first surface portion 16a and a second optical beam 24b propagated towards the second surface portion 16b. In some other embodiments, the first and second optical beams 24a and 24b can be propagated by two or more optical sources as well.

It was found that as the first and second optical beams 24a and 24b are propagated towards the first and second surface portions 16a and 16b of the substrate 14, respectively, the first optical beam 24a propagates across a portion of the substrate 14 that the second optical beam 24b does not. Conversely, the second optical beam 24b propagates across a portion of the medium 12 that the first optical beam 24a does not. Such difference in propagation conditions cause the first and second optical beams 24a and 24b to experience a phase delay $\Delta\phi$ relative to one another after propagation through the substrate 14.

Referring back to FIG. 1, the system 10 has a detector 26 collecting the first and second optical beams 24a and 24b after propagation across the substrate 14 in this example. As can be understood, the detector 26 operate at least at the given wavelength $\lambda_0$ of the first and second collected optical beams 24a and 24b. In this specific embodiment, it was found convenient to provide the detector in the form of an array of detectors 28.

Upon collecting the first and second optical beams 24a and 24b, the array of detectors 28 generates first and second signals 30a and 30b being indicative of first and second phases $\phi_1$ and $\phi_2$ associated to the first and second collected optical beams 24a and 24b, respectively. It is intended that the phase delay $\Delta\phi$ relative to the first and second optical beams 24a and 24b can be retrieved, directly or indirectly, from the first and second signals 30a and 30b. Examples of such phase delay retrieving techniques will be described below.

Using a computer 32, the system 10 determines a refractive index $n_m$ of the medium 12 based on the first and second signals 30a and 30b, which are indicative of the phase delay $\Delta\phi$, the given depth d, the given wavelength $\lambda_0$ and a refractive index $n_s$ of the substrate 14, which can be either known or previously measured.

For instance, in some embodiments, the refractive index $n_m$ of the medium 12 can be determined using a relation equivalent to the following equation:

$$\Delta\phi = \phi_1 - \phi_2 = \frac{2\pi}{\lambda_0}(n_m - n_s)d. \quad (1)$$

Equation (2) can be manipulated to yield:

$$n_m = n_s + \frac{\lambda_0}{2\pi}\frac{\Delta\phi}{d}. \quad (2)$$

Accordingly, the computer 32 can have a processor 34 and a memory 36 having instructions 38 stored thereon that when executed by the processor 34 performs the determination based on the above equations or other equivalent equations. In some alternate embodiments, more complex equations which can take into consideration refraction, diffraction and/or reflection can be used. For instance, the equations can take into consideration any known spatial variations of the depth d as function of x- and y-coordinates. Data, including but not limited to, the given depth d, the given wavelength $\lambda_0$ and the refractive index $n_s$ of the substrate 14 can be previously stored on the memory 36 and be accessible by the processor 34 upon request.

The processor 34 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 36 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In this example, the detectors 28 of the array are distributed along the x-axis and collect the first and second optical beams 24a and 24b after their propagation through the substrate 14. FIG. 2 is an example of a graph showing phase delay as function of spatial coordinates along the x-axis of the substrate 14. As shown, in this example, detector(s) 28 of the array collecting the first optical beam 24a generates a first signal 30a indicative of a first phase $\phi_1$ whereas detector(s) 28 of the array collecting the second optical beam 24b generates a second signal 30b indicative of a second phase $\phi_2$.

Referring back to FIG. 1, the first and second optical beams 24a and 24b are provided in the form of a propagating wave front. In such wave fronts, all the optical beams comprised therein are in-phase relative to one another. However, in some other embodiments, the first and second optical beams 24a and 24b can be out of phase relative to one another. In these embodiments, knowing the initial phase delay between the first and second optical beams 24a and 24b can be convenient.

Examples of optical sources 22 include, but are not limited to, coherent optical sources, incoherent optical sources and partially coherent optical sources, polarized or unpolarized, monochromatic or polychromatic, continuous wave (CW) or pulsed, and the like. Examples of which can include solid state laser sources, fiber laser sources, gas laser sources, semiconductor laser sources, supercontinuum sources, super luminescent diodes, light emitting diodes, white lamps and the like. It is encompassed that, in some embodiments, optical components such as optical filters can be provided upstream from the array of detectors 28 to filter out undesired noise or power within undesired spectral band(s).

It is intended that the substrate 14 is made of an optically transparent material in embodiments where the optical beams 24a and 24b are meant to propagate through the substrate 14. However, in embodiments where the optical beams 24a and 24b are reflected on the first surface 16 of the substrate 14, the material of the substrate 14 needs not to be optically transparent at the wavelength $\lambda_0$ of the first and second optical beams 24a and 24b. It is also intended that the material of the substrate 14 be biologically compatible in embodiments where biological samples are to be received thereon. Examples of materials of the substrate 14 include, but are not limited to, glasses, plastics, polymers such as polycarbonate, and the like.

Moreover, the first and second optical beams 24a and 24b are orthogonal to the plane 19 of the substrate 14 in this example. In alternate embodiments, the first and second optical beams 24a and 24b can form an angle relative to the plane 19 of the substrate 14. In these embodiments, equation (2) as seen above may be modified by weighing the depth d with a trigonometric factor function of the angle (e.g., cosine of the angle, sine of the angle), depending on how the angle is measured relative to the plane 19 of the substrate 14.

As depicted, the system 10 can have an enclosure 38 having an optically transparent base 40, lateral walls 42 sealingly extending from the optically transparent base 40 towards an optically transparent top 44. As shown, the enclosure 38 defines a sealed cavity 46 within which the medium 12 is received in this example. As shown, in this embodiment, the substrate 14 is provided in the form of the base 40 of the enclosure 38, with the first surface 16 of the substrate 14 facing towards the cavity 46 thereby allowing the medium 12 to be received on the first surface 16. However, in some alternate embodiments, the substrate 14 could have been provided equivalently in the form of the top 44 of the enclosure 38, again with the first surface 16 of the substrate 14 facing towards the cavity 46. In alternate embodiments, the enclosure 38 is optional. More specifically, the substrate 14 can be made integral to a frame which is open to the surrounding environment.

Regardless of whether the substrate 14 is made integral to the enclosure 38, the substrate 14 can be provided in the form of a microscope slide, as will be described with reference to FIGS. 3-6.

Now referring specifically to FIG. 3, there is shown an example of a substrate 114 having a coverslip 150 having an original surface 152 from which the first surface portion 116a protrudes. The protrusion 154 of the first surface portion 116 relative to the original surface 152 of the coverslip 150 can be obtained using material addition techniques such as moulding, 3D printing, photolithography, soft-lithography or any other suitable techniques. In this case, the original surface 152 of the coverslip 150 acts as the recessed second surface portion 116b. It is envisaged that in some other embodiments the substrate 114 can be provided in the form of a microscope slide instead of the coverslip 150.

In this example, the first and second optical beams 124a and 124b propagate through the substrate 14 from the first surface 116 towards the second surface 118 of the substrate 114. Accordingly, in this embodiment, the first and second optical beams 124a and 124b have similar propagation conditions along a first path portion 156 extending from the optical source towards the first surface portion 116a, a second path portion 158 extending across a shared thickness of the substrate 114 and a third path portion 160 extending from the second surface 118 of the substrate 114 towards the array of detectors.

As depicted, both the first and second surface portions 116a and 116b of the substrate 114 receive the medium 112 in this embodiment. Accordingly, the propagation of the first and second optical beams 124a and 124b across the first, second and third path portions 156, 158 and 160 create no phase delay between the first and second optical beams 124a and 124b in this example, as the propagation conditions are shared across the medium 112. However, the first optical beam 124a propagates through the protrusion 154 via the first surface portion 116a, whereas the second optical beam 124b propagates through the depth d of medium 112 received on the second surface portion 116b. Such difference in propagation conditions creates the phase delay $\Delta\phi$ discussed above, as schematically emphasized with dotted lines in the figure.

As shown in FIG. 4, the substrate 214 has a coverslip 250 with an original surface 252 corresponding to the first surface portion 216a, whereas the second surface portion 216b is recessed from the original surface 252 using material removal techniques such as engraving, etching or any other suitable techniques.

The direction of the first and second optical beams 224a and 224b can vary, depending on the embodiment. For instance, FIG. 4 shows that the first and second optical beams 224a and 224b propagate through the substrate 214 via the second surface 218 of the substrate 214. More specifically, the first and second optical beams 224a and 224b have similar propagation conditions along a first path portion 256 extending from the optical source towards the second surface 218 of the substrate 214, a second path portion 258 extending across the shared thickness of the substrate 214, and a third path portion 260 extending from the first surface portion 216a of the first surface 216 of the substrate 214 towards the array of detectors.

In this example, the medium 212 is received only on the second surface portion 216b. However, as can be understood, it is still the difference in propagation conditions across the depth d that the first and second optical beams 224a and 224b experience which creates the phase delay $\Delta\phi$ discussed above, as schematically emphasized with dotted lines in the figure.

Although the embodiments described above show the first and second optical beams 224a and 224b propagating through the substrate 214, this needs not be the case. For instance, FIGS. 5 and 6 show embodiments in which the first and second optical beams propagate towards the substrate and then reflect by the substrate, prior to reaching the array of detectors.

More specifically, FIG. 5 shows that the first surface 316 of the substrate 314 is coated with a reflective layer 364. Examples of such reflective layers can include, but are not limited to, a metallic coating, a dielectric coating and any other suitable reflective layer. In such embodiments, a factor two can appear in equation (2) discussed above, as the second optical beam 324b propagates two times rather than once across the given depth d spacing the first and second surface portions 316a and 316b from one another.

Referring now to FIG. 6, only the second surface 418 of the substrate 414 is coated with a reflective layer 464. In these embodiments, the first and second optical beams 424a and 424b collected with the array of detectors can consist of Fresnel reflections upon the first surface 416 of the substrate 414. However, in other embodiments, the array of detectors can detect Fresnel reflections upon the first surface 416 of the substrate 414 and also the reflections upon the reflective layer 464 of the second surface 418 of the substrate 414. In some embodiments, the reflective layer 464 of the second surface 418 is omitted, and the array of detectors detects Fresnel reflections upon the second surface 418 of the substrate 414 can be used as well. In other words, Fresnel reflections upon the first surface 416 and/or Fresnel reflections upon the second surface 418 can be used.

FIG. 7 shows a top view of an example of a substrate 514, in accordance with an embodiment. As depicted, the substrate 514 has a first surface 516 having a plurality of spaced-apart series of alternating first and second surface portions 516a and 516b extending along the y-axis. This series is provided in the form of a plurality of spaced-apart grooves 570 recessed in the first surface 516 of the substrate 514. As can be understood, such a number of spaced-apart grooves 570 can allow a plurality of refractive index measurements to be made at once within a same field of view of the array of detectors.

As best shown in FIG. 7A, the grooves 570 have a downward slope towards the second surface portion 516b followed by an upward slope back towards the first surface portion 516a. Although the slopes are somewhat vertical in this embodiment, the slopes can be smoother in other embodiments. For example, the slopes can form an angle of 30°-40° relative to the plane 519 of the substrate 514. The grooves 570 are shaped with a rectangular shaped bottom 572 in this example. However, in alternate embodiments, the bottom of the grooves 570 can be shaped otherwise. For instance, the grooves 570 can include, but are not limited to, a triangular shaped bottom, a circular shaped bottom, a parabolic shaped bottom, a shaped bottom which would minimize or otherwise reduce optical diffraction, or any other suitable concave or convex bottom. It is noted that shapes having smooth surface transitions can be preferable in some embodiments, as they are generally more easily cleanable.

Still referring to FIG. 7, there is shown a medium interface 574 which delimits a first medium 512a of a first refractive index $n_{m1}$ from a second medium 512b of a second refractive index $n_{m2}$. In this example, it may be preferred to flow the first and second media 512a and 512b along the y-axis, parallel to the grooves 570, as it may also contribute to facilitate the cleaning of the substrate 514. However, in some other embodiments, the grooves 570 can be perpendicular to the flow F of medium, or have any other angle therebetween.

FIG. 8 is a refractive index map 580 showing coordinates of the substrate 514 along both the x- and y-axes of the substrate 514, and the first and second refractive indexes $n_{m1}$ and $n_{m2}$ being indicated by a gradient of color at the corresponding coordinates x,y. The region sampled with the first and second optical beams 524a and 524b in FIGS. 7 and 7A is identified with a dotted region R in FIG. 8.

In this example, the first medium 512a surrounds a cell 582 at given coordinates of the substrate 514. In this way, the first refractive index $n_{m1}$ of the first medium 512a next to the cell 582 can be determined precisely using the methods and systems described herein, in a localized and real time or quasi real-time manner. For instance, should the cell 582 is to be imaged with techniques which require the refractive index of the surrounding medium $n_{m1}$ to be precisely known, such as in DHM techniques, the so-determined first refractive index $n_{m1}$ can then be used to image the cell 582 in an increasingly quantitative manner.

It is also encompassed that the method can be performed with first and second optical beams 524a and 524b having power within spectral bands at other wavelengths, to provide spectroscopic refractometry measurements including multi-spectral or hyperspectral refractive index spectrums and the like. In such embodiments, the refractive index can be measured at many wavelengths using a broadband light source such as a supercontinuum light source or a tunable light source. In these embodiments, it may be advantageous to perform dispersion measurements using the so-determined refractive index spectra.

FIGS. 9-11 show different examples of DHM systems 600, 700 and 800 which can incorporate similar or different embodiments of the system 10 described above. Examples of such DHM systems includes those described in U.S. Pat. No. 6,262,818 B1, to Cuche et al., the content of which are hereby incorporated by reference.

FIGS. 9-11 show embodiments of different systems 600, 700 and 800 for determining a refractive index of a medium, in accordance with some embodiments.

More specifically, FIG. 9, the system has a Michelson interferometer 601 designed for phase imaging in the reflection geometry. A main wave front 624 emitted by an optical source 622 is expanded in diameter and the interferometer 601 comprises a microscope objective 605 in the object arm 607 which focuses on a substrate 614 and a mirror 609 in the reference arm 611 which reflects the main wave front 624 as reference. If the mirror is tilted, with two degrees of freedom for instance, off-axis holograms can be recorded on the array of detectors 628.

As shown in FIG. 10, the system 700 has a Mach-Zehnder interferometer 701 designed for phase imaging in the transmission geometry. The interferometer 701 comprises two beam expanders 703 in each of the object and reference arms 707 and 709 of the interferometer 701. A configuration with only one beam expander located just after the optical source can also be used. The beam expander may include a pinhole for spatial filtering. In the object arm 707, a microscope objective 705 collects the first and second optical beams that are transmitted through the substrate. In the reference arm 709, a mirror 711 which can be tilted reflects a plane wave as reference.

As shown in FIG. 11, the system 800 has a Mach-Zehnder interferometer 801 designed for reflection quantitative phase imaging. In the system 800, a lens with a long focal length is inserted between a beam expander and a microscope objective. This lens acts as a condenser and its position is adjusted to illuminate the substrate through the microscope objective with a collimated beam. This condenser is important for reflection quantitative phase imaging because in holographic microscopy the medium can be located near the object focal plane of the microscope objective. If necessary, for example if a high intensity is desired for the object illumination, a condenser can also be inserted before the substrate in the transmission geometry presented in FIG. 10. This condenser is an example of optional optical components featured in FIG. 10. These examples up are adequate for the creation of Fresnel off-axis holograms.

Additional elements called optional optical elements (see FIGS. 9-11) can be introduced in both arms of the interferometer and/or before and/or after the beam splitters located at the entrance and/or at the exit of the interferometers. Neutral density filters, prisms, retarding means, half-wave plates, quarter-wave plates, polarizing plates, Wollaston prisms, iris diaphragms, lenses, spatial filters, pinholes are examples of optional optical elements. As shown in dotted lines in FIG. 10, a Wollaston prism can be used to separate the reference wave into two components with crossed polarizations and different directions of propagation. Polarizing beam splitters can also be used instead of simple beam splitters. With each of the presented set-ups, direct imaging is possible by removing the microscope objective or the lens and the present invention can be used as a method for lens-less imaging.

In the examples of system presented in FIGS. 9-11, optional optical elements can be inserted along the paths of the reference wave and/or along the path of the object wave. For example, modulators which modify the wavelength and/or the amplitude and/or the frequency and/or the polarization and/or the phase and/or the optical path length of the waves. Polarizers, half and quarter wave plates, Wollaston prisms, neutral density filters, acousto-optic modulators, liquid crystal devices, dielectric media, assembly of prisms and/or mirrors are example of means which can be used as optional optical elements.

Many other configurations can be used for the design of a system in accordance with the present disclosure, with the systems 600, 700 and 800 being shown as examples only.

It will be appreciated that in these DHM systems 600, 700 and 800 of FIG. 9-11, the detectors of the array are intensity detectors such as charged-coupled devices (CCDs). As such, during collection of the first and second optical beams, a reference beam is simultaneously shined onto the array of intensity detectors. By optical interference of the reference beam and the first and second collected optical beams on a respective one of the intensity detectors, the corresponding intensity detector can generate a signal being indicative of the intensity of an interference between the reference beam and a respective one of the first and second collected optical beams. Such signal can thereafter be converted to a quantitative phase, a quantitative phase delay and/or a quantitative phase image, if deemed appropriate, to subsequently determine the refractive index $n_m$ of the medium.

The detector can also be provided in the form of a video camera. Charged Coupled Device (CCD) camera, intensified or cooled CCD, progressive scan CCD, line-scan camera, electron bombardment CCD (EB CCD) high resolution camera, integrating CCD, numerical or digital camera, complementary metal oxide semi-conductor (CMOS) image sensors, array of photodiodes, array of sensors, array of acoustic sensor, are examples of devices which can be used as detectors. Slower image acquisition systems which acquires an image of the hologram by scanning a sensor in a plane with a mechanical device can also be used. An image of the hologram can also be recorded on a photographic plate, on a photopolymer film or using another photochemical process. A photorefractive crystal can also be used as image acquisition system.

Other types of detectors, or techniques to retrieve the phase of the first and second collected optical signals can be used. For instance, such techniques can include interferometric techniques and non-interferometric techniques. Interferometric techniques can include non-common path configurations such as the one described above with reference to FIGS. 9-11 or other quantitative phase imaging technique such as Hilbert phase microscopy (HPM) as discussed in T. Ikeda, G. Popescu, R. R. Dasari, and M. S. Feld, "Hilbert phase microscopy for investigating fast dynamics in transparent systems," Opt. Lett. 30(10), 1165 (2005), the content of which is hereby incorporated by reference. Interferometric techniques can also include common path configurations such as quadriwave lateral shearing interferometry (QWLSI), diffraction phase modulation (DPM) and gradient light interference microscopy (GLIM) such as discussed in T. H. Nguyen, M. E. Kandel, M. Rubessa, M. B. Wheeler, and G. Popescu, "Gradient light interference microscopy for 3D imaging of unlabeled specimens," Nat. Commun. 8(1), 210 (2017), Fourier phase microscopy (FPM) such as discussed in G. Popescu, L. P. Deflores, J. C. Vaughan, K. Badizadegan, H. Iwai, R. R. Dasari, and M. S. Feld, "Fourier phase microscopy for investigation of biological structures and dynamics," Opt. Lett. 29(21), 2503 (2004), and spatial light interference microscopy (SLIM) such as discussed in Z. Wang, L. Millet, M. Mir, H. Ding, S. Unarunotai, J. Rogers, M. U. Gillette, and G. Popescu, "Spatial light interference microscopy (SLIM)," Opt. Express 19(2), 1016 (2011), the contents of which are hereby incorporated by reference. Non-interferometric techniques can include TIE techniques, ptychography such as discussed in J. Marrison, L. Räty, P. Marriott, and P. O'Toole, "Ptychography—a label free, high-contrast imaging technique for live cells using quantitative phase information," Sci. Rep. 3(1), 2369 (2013), the content of which is hereby incorporated by reference, and/or computational imaging techniques. Examples of such techniques can additionnally be described in Bon, Pierre, et al. "Quadriwave lateral shearing interferometry for quantitative phase microscopy of living cells." Optics express 17.15 (2009): 13080-13094., E. D. Barone-Nugent, A. Barty, and K. A. Nugent, "Quantitative phase-amplitude microscopy I: Optical microscopy," J. Microsc. 206(3), 194-203 (2002), and Popescu, Gabriel, et al. "Diffraction phase microscopy for quantifying cell structure and dynamics." Optics letters 31.6 (2006): 775-777, the contents of which are hereby incorporated by reference. Diffraction tomography techniques can also be used. Such diffraction tomography techniques are described in the four following publications: Cotte Y, Toy F, Jourdain P Pavillon N, Boss D, Magistretti P, Marquet P, Depeursinge C. 2013, Marker-free phase nanoscopy, Nature Photonics, vol. 7, no. 2, pp. 113-117; Choi W, Fang-Yen C, Badizadegan K, Oh S, Lue N, Dasari R R, Feld M S. Tomographic phase microscopy. Nat Methods. 2007 September; 4(9):717-9; Nguyen T H, Kandel M E, Rubessa M, Wheeler M B, Popescu G. Gradient light interference microscopy for 3D imaging of unlabeled specimens. Nat Commun. 2017 Aug. 8; 8(1):210; and Kim Y, Shim H, Kim K, Park H, Heo J H, Yoon J, Choi C, Jang S, Park Y. Common-path diffraction optical tomography for investigation of three-dimensional structures and dynamics of biological cells. Opt Express. 2014 May 5; 22(9):10398-407, the contents of which are hereby incorporated by reference. Regardless of which technique is used to measure the phase of the first and second collected optical beams, the computer can perform phase unwrapping functions on the first and second signals in embodiments where the depth d is greater than the given wavelength $\lambda_0/(n_m - n_s)$, where $\lambda_0$ denotes the wavelength in free space.

Example 1—Timely and Spatially Resolved In Situ Liquid Refractometry Using Quantitative-Phase Digital Holographic Microscopy FIG. 12A proposes another example of a system for determining a refractive index of a medium. In this example, the system has an enclosure having an optically transparent base, lateral walls extending from the optically transparent base towards an optically transparent top. The top is provided in the form of a conventional microscope slide. However, the base is provided in the form of a substrate having a first surface with a series of grooves recessed therein, thus providing a series of alternating first and second surface portions such as those described above.

In this specific example, the enclosure has an input port extending across one of the lateral walls of the enclosure, and an output port extending across an opposite one of the lateral walls of the enclosure. The input and output ports define a flow path along which the medium can be flowed or otherwise perfused in and out during use. Moreover, the system can have a pump flowingly connected to the input port for pumping the medium into and out of the enclosure via the input and output ports. Additionally or alternatively, gravity perfusion can be used to draw the medium into and out of the enclosure.

It will be understood that measurements of the refractive index of the medium can be performed in real time as the medium is flowed on the first surface of the substrate. This could be useful in some applications including, but not limited to, drug screening or any other suitable pharmacological experiment. It is noted that by doing so, the refractive index of the medium can be determined as function of time. In embodiments where a plurality of media are successively flowed on the first surface of the substrate, determining the refractive index of the media as a function of time can allow to determine the refractive index for each of the media.

The refractive index is a very important parameter in liquid characterization. It provides an accurate and precise way of measuring the concentration of a solute or the pureness of a solution. As such, liquid refractometry has been used as a quality-control or characterization tool in a wide range of research areas such as agriculture, pharmacology, medicine, materials science and the emerging field of optofluidics. The precise determination of the refractive index of liquids have also been shown to play an important role in quantitative phase imaging (QPI). QPI quantitatively measure the minute phase shift, namely, the quantitative phase signal (QPS), retrieved using interferometric or non-interferometric approaches, that transparent microscopic specimens, differing from the surrounding medium only by a slight difference of RI, induce on the transmitted wavefront, such as living cells in culture. Therefore, the RI of the liquid immersing the sample is an active parameter of the quantitative phase image formation process.

Over the last 30 years, many types of refractometers have been reported in the literature, with a wide range of characteristics and performance in term of versatility, precision and cost-effectiveness, reflecting the plurality of applications for liquid refractometry. Most of these approaches rely either on geometrical optics, including total internal reflection and ray deviation, or interferometry. In the first category, the most successful approach is the Abbe refractometer, with a typical refractive index precision of 0.0003. The refractive index of the investigated liquid, placed at the surface of a well-characterized prism, is determined from the angle of total internal. Due to its low cost, simplicity, robustness and compactness, the Abbe refractometer is the most widely used commercial approach for liquid refractometry. In the geometrical optics approaches, the range of potentially measured refractive index is limited by the refractive index of the optical component in contact with the liquid. Interferometry-based refractometers rely the phase shift that undergoes light when it goes through a medium to measure its refractive index. Typically able to achieve very high accuracy, up to the sixth decimal, over a broad range of refractive index and wavelengths, those refractometers often require to move mechanical pieces or depend on a very precise alignment, which is time-consuming and complicates measurements. Also, as the precision of those systems increase linearly with the light travel path, a good precision can only be achieved with a large volume of liquids, in the order of dozens of mL or more, compared to the typical Abbe refractometer working volume of 1 mL. More recently, waveguide-based refractometers have emerged, allowing in situ measurement of the refractive index of liquids and tissues, especially for biomedical and biological applications. Mostly used to measure changes in refractive index, only a few designs allow for absolute refractive index measurements, and precisions higher than 0.001 usually come at the cost of a very extensive, device-specific characterization. Furthermore, those devices only work at the guided wavelengths, which is typically a narrow band in the near infrared.

In this example, the development of an interferometric refractometer of a new kind is presented, which combines the advantages of most of the aforementioned techniques. Based on quantitative phase digital holographic microscopy (QP-DHM), it is capable of measuring accurate and precise absolute refractive index in situ, in a time-resolved manner and on a wide range of refractive index and wavelengths. It does not require any mechanical movement between successive measurements nor the use of a large sample volume, unlike most of the other interferometric approaches. Finally, since our approach is based on microscopy, the determination of local refractive index or the measurement in inhomogeneous media, are made possible.

The setup consists of a digital holographic microscope (T-1003, Lyncée-Tec), based on a Mach-Zehnder interferometer. As illustrated in FIG. 12A, a closed chamber is placed in the object path of the microscope. The custom-made and 3D-printed chamber, already described elsewhere, is filled with the liquid to investigate. Both coverslips are in fused silica, and the bottom coverglass is grooved. The grooves (see FIG. 12B) are of very well-known depth, confirmed with a surface profiler (Dektak 150, Veeco). A typical profile is shown in FIG. 12C.

Figure 12F:
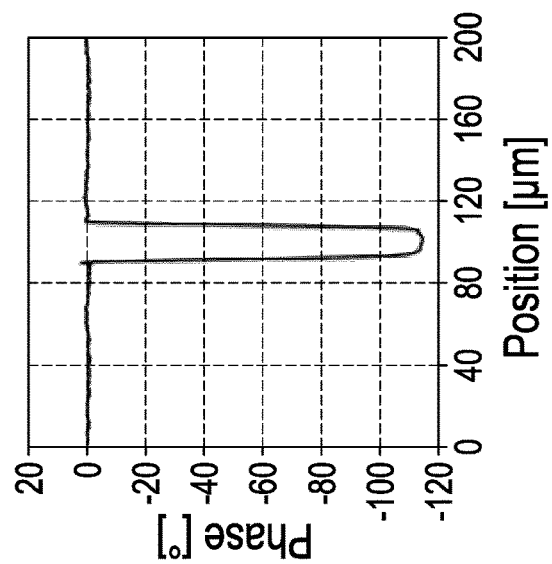
FIG. 12F is a graph showing phase as function of position for the groove of FIG. 12A, as measured using the system of FIG. 12A, in accordance with an embodiment.
Figure 12E:
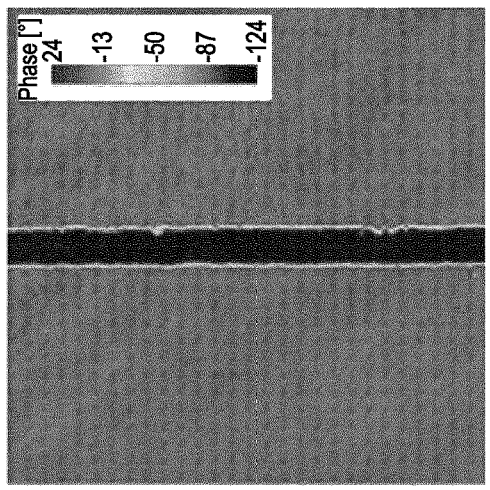
FIG. 12E is a quantitative phase image retrieved from the hologram of FIG. 12D, in accordance with an embodiment.
Figure 12D:
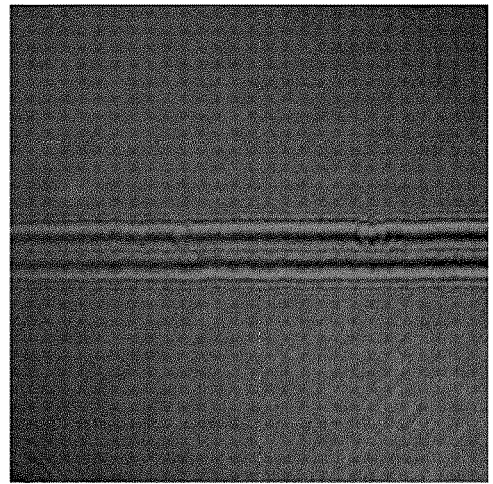
FIG. 12D is a hologram recorded by the system of FIG. 12A, resulting from propagating first and second optical signals through the substrate of FIG. 12A, in accordance with an embodiment.

In order to make a refractive index measurement, 50 consecutive holograms are recorded by the microscope camera (acA1920, Basler), which correspond to a total exposure time of about 280 ms, using a 20× objective, 0.80 NA (HC PL FLUOTAR, Leica). A typical recorded hologram, in this case with the chamber filled with isopropanol, is shown in FIG. 12D. These holograms are then reconstructed using a commercial software (Koala, Lyncée Tec) to produce 50 quantitative-phase images that are in turn averaged together to reduce the time-dependent part of the coherent noise. An averaged quantitative-phase image is shown in FIG. 12E. A vertical averaging of this quantitative-phase image, leading to a 1-D quantitative phase profile of the groove, is shown in FIG. 12F, where the flat background can be clearly seen, corresponding to the bare coverslip, as well as the phase shift caused by the groove.

To retrieve the exact QPS between the background and the bottom of the groove, an automatic iterative method was implemented in Matlab (R2016a, MathWorks). Briefly, an offset is applied to the central part of the groove (corresponding to roughly 50% of its whole width) in order to roughly align it with the baseline. Then, a polynomial fit is applied on both the background and the offsetted groove. The offset is adjusted in order to minimize the error on the fit, and the best-offset value is considered the QPS caused by the groove.

The relation between the refractive index of the liquid contained in a groove of depth d producing a QPS $\Delta\phi$ expressed in degree, is given by:

$$n_m = n_g - \frac{\lambda \Delta \phi}{360 d'} \quad (3)$$

where $n_m$ is the refractive index of the investigated liquid, $n_g$ the refractive index of the coverglass and $\lambda$ the free-space wavelength of the source used. The wavelength of the source, in our case a diode laser, was 666 nm. The refractive index of the coverglass, $n_g$, a commercially available 250 µm-thick fused silica coverslip (Product 26019, Ted Pella, inc.) was measured multiple times at different wavelength using a commercial refractometer (2010/M, Metricon) and determined to be 1.4575 at 666 nm. The grooves were fabricated using standard photolithography and Reactive Ion Etching (RIE) with an oxygen/fluoroform gas mix in a commercial apparatus (model 790, Unaxis), which provided grooves of uniform depth. The depth of the grooves used was measured to be (1584±6) nm using a Dektak device, as already discussed (see FIG. 12C). Imaging the bare grooved coverglass in air ($n_m$=1.000) under the DHM give a second way of measuring the depth of the groove, using Eq. 1 with d as the only unknown. This measurement led to a depth of (1589±2) nm, which is consistent with the Dektak value of (1584±6) nm. As the DHM measurement is more precise due to the interferometric nature of the measuring process, it is the value of d used in Eq. 1 for the liquid refractive index determination. With the RIE process, the depth of the grooves is very repeatable within one batch of processed coverglasses, down to the 5-nm precision of our Dektak device. Thus, only one measurement is needed for a whole batch of coverslips fabricated within the same RIE recipe.

The refractive index of several liquids was determined using our refractometer, in order to characterize its performance. The liquids investigated were distilled water, methanol (A412, Fisher Chemical), isopropanol (A416, Fisher Chemical) and two physiological solutions, thus containing multiple ions in controlled quantity, used in the context of QPI. The first one contains mannitol (M4125, Sigma-Aldrich), a hydrophilic sugar, and the other one contains Histodenz™ (D2158, Sigma-Aldrich) instead, a non-ionic molecule designed to significantly shift the refractive index of a solution. Both these physiological solutions are typically used in the decoupling procedure, an experiment used in QPI to retrieve the refractive index and the thickness of a biological sample separately.

For each liquid, 80 refractometry experiments were performed. Each refractometry experiment consists of unmounting the chamber, cleaning the top and the bottom coverglasses using isopropanol and distilled water, mounting it back in place and filling it with the liquid to investigate, then imaging and treating it with the aforementioned procedure. These experiments are referred to as static absolute refractometry experiment.

As, in many situations, interest lies in a refractive index shift instead of an absolute value measurement, a second experiment was designed to investigate the performance of our refractometer for this application. In this case, for each measurement, the chamber is unmounted, cleaned, mounted again and filled with a first liquid which is imaged and analysed as before. Then, a second liquid is injected in the chamber, pushing the first liquid out, which usually takes a dozen of seconds, and a new acquisition is performed and treated in the same manner. The difference in refractive index is determined by subtracting the measured refractive index for the first solution by the one of the second solution. Even if, in this experiment, the refractive index of individual solutions is determined with the same precision than with the aforementioned static absolute refractometry experiment, the measured refractive index difference is much more precise as a substantial part of the noise is time-independent and cancels out in the process. Thus, this approach can also be used to determine more precisely the absolute refractive index of the second solution, assuming the refractive index of the first one is known. This alternative approach can be used to measure the refractive index using a reference liquid as the static referenced absolute refractometry experiment.

This referenced absolute refractometry experiment was performed with two different liquid exchanges, the first one with a change from distilled water to the physiological solution containing mannitol and the second one with a change from distilled water to the physiological solution containing Histodenz, using in both cases the distilled water as the reference liquid, because of its thorough characterization in the literature.

Figure 13A:
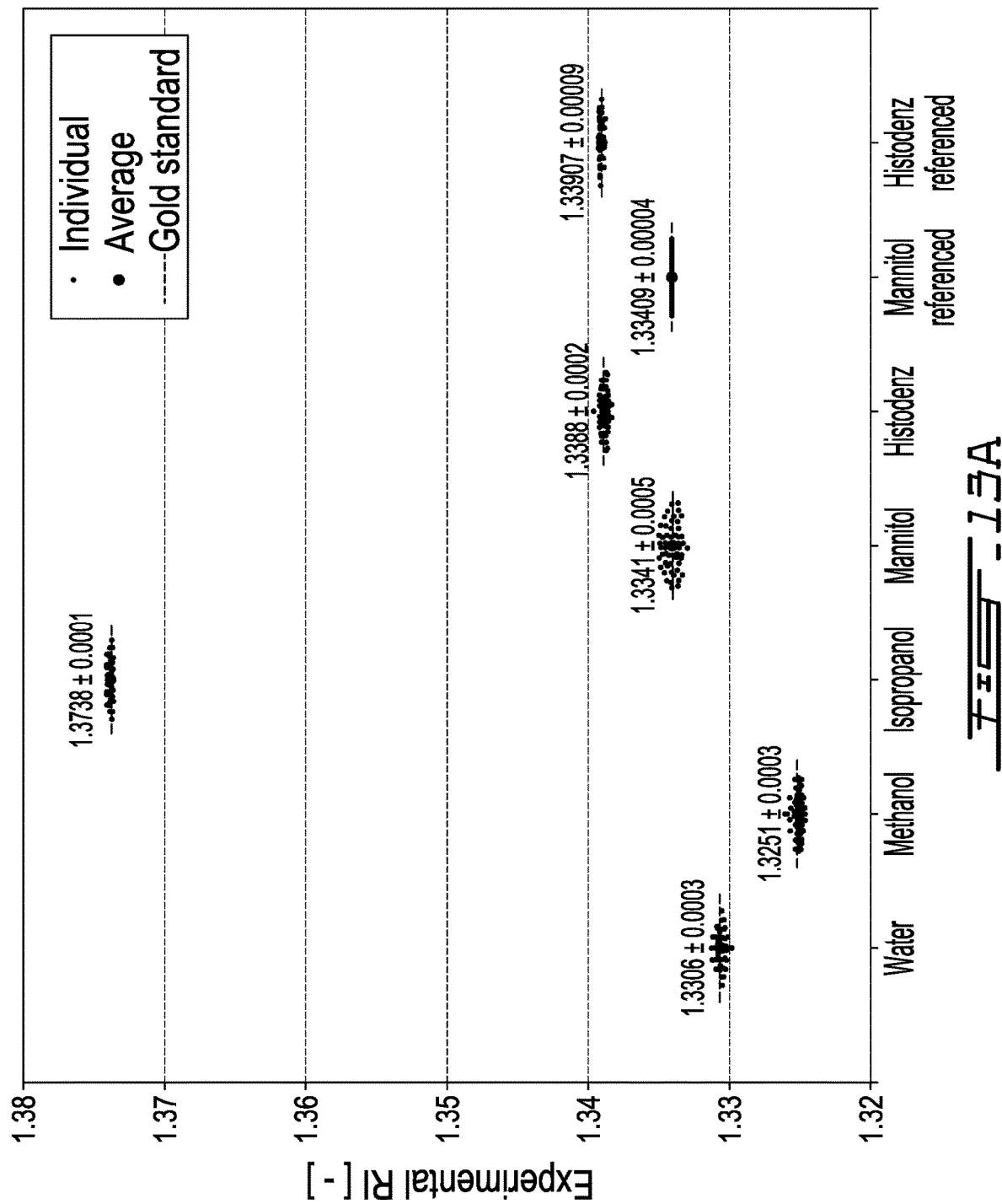
FIG. 13A is a graph showing refractive index measurements for different types of media, as measured with different methods, in accordance with an embodiment.

Results for every liquid in both experiments, i.e. the static absolute refractometry experiment and the static absolute referenced one, are summarized in FIG. 13A. Each time, the same liquid refractive index was measured using a high-end commercial Abbe refractometer (Abbemat M W, Anton Paar) and the obtained value is displayed as the dotted red line. Each grey dot represents a single measurement with the proposed device, with the average and the standard deviation given by the blue dot and the black bars respectively. Their values are also directly written on top of each data group. As the standard deviation is small, the black bars are barely visible on FIG. 13A. In order to better visualize the precision and the accuracy obtained for each liquid, which are difficult to embrace in FIG. 13A because of the wide range of absolute refractive index investigated, FIG. 13B shows the deviation between each data point and the Abbe refractometer measurement instead of the absolute value of the RI.

Figure 13B:
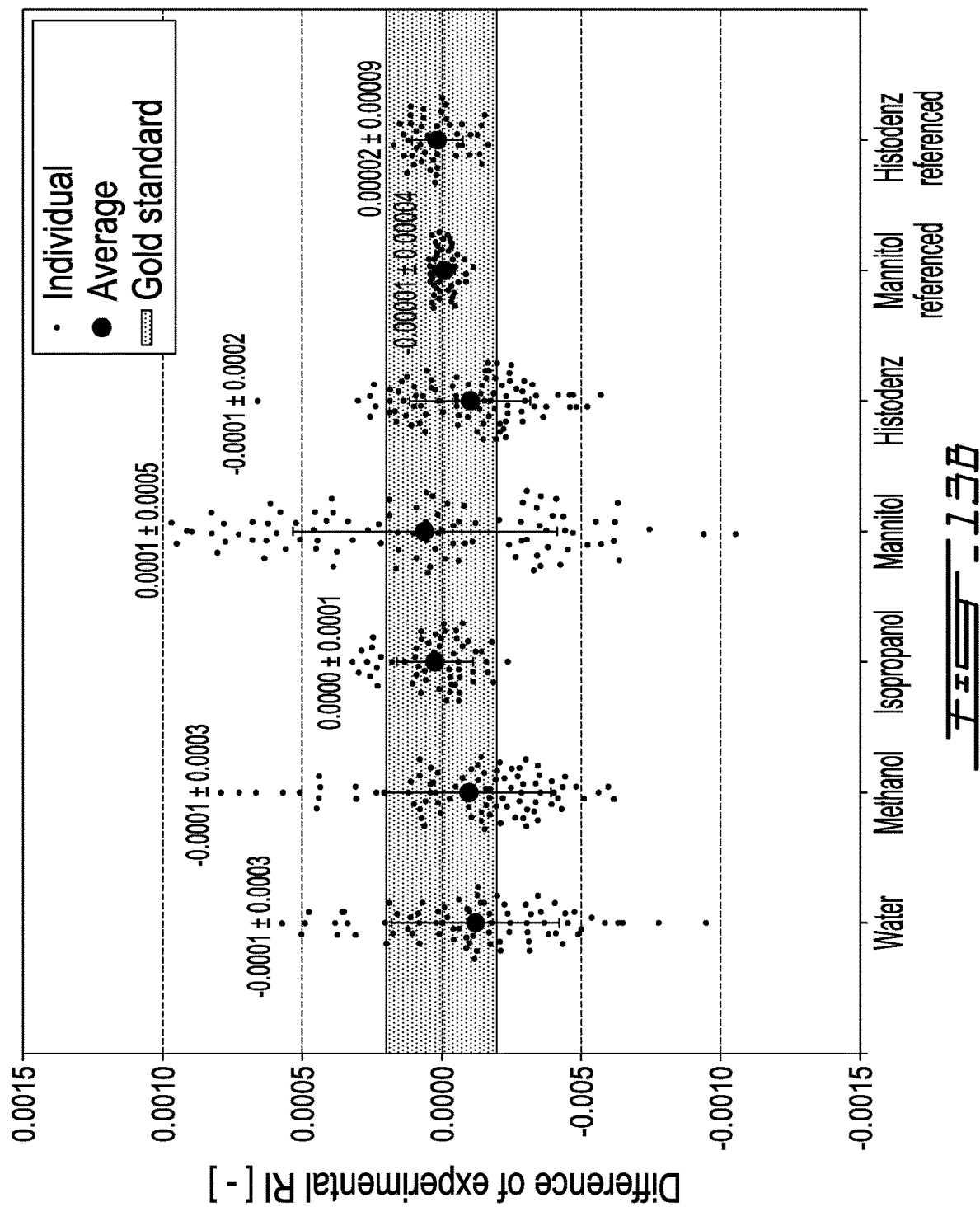
FIG. 13B is a graph showing refractive index difference measurements emphasizing accuracy and precision of the measurements of FIG. 13A as compared with Abbe refractometer measurements, in accordance with an embodiment.

In FIG. 13B, the light red region shows the measurement error of a typical Abbe refractometer, which is 0.0003, and the darker region the typical measurement error for a high-end commercial Abbe refractometer, which is 0.00004.

It can be seen that, for each liquid, the proposed refractometer gives accurate and precise value of refractive index, without the need of any calibration nor any intricate calculation. Indeed, in absolute refractometry, the refractive index of distilled water, methanol, isopropanol, the mannitol solution and the Histodenz solution were measured to be (1.3306±0.0003), (1.3251±0.0003), (1.3738±0.0001), (1.3341±0.0005) and (1.3388±0.0002) respectively, with a maximum error compared to gold standard measurement of 0.0001 as can be seen in FIG. 13B, which is well within the uncertainty on the measurements. Thus, the precision obtained in the absolute refractometry experiment is roughly the same than the one of a typical Abbe refractometer. It is interesting to note that the repeatability seems to be better with liquids of higher refractive index. This is because when the liquid refractive index is higher, it reduces the refractive index shift between the liquid and the adjacent coverglasses in the chamber, which reduce the coherent noise due to multiple reflections at those interfaces.

The absolute referenced refractometry approach is a good alternative to the direct refractive index measurement if more precision is needed. In fact, in this situation, the refractive index of the mannitol solution and the Histodenz solution were measured to be (1.33409±0.00009) and (1.33906±0.00004) respectively, which corresponds to roughly a factor 4 increase in the precision compared to the direct approach. As discussed above, this experiment requires a reference liquid, for which distilled water is an obvious choice because of its thorough investigation under many different conditions in the literature, even if theoretically any liquids, as long as its characteristics are well-known, can be used. As it seems that the repeatability on the refractive index depends on the refractive index shift measured (0.00327 in the case of the referenced mannitol and 0.00825 in the case of the referenced Histodenz), the use of a reference liquid with a refractive index closer to the investigated liquid should increase the precision on the measured refractive index, if needed. For both these experiments, the volume of liquid needed to fill the chamber was 0.15 mL, which is even lower than the volume of 1 mL typically used with the Abbe refractometer. This volume can be further reduced by decreasing the height of the chamber or the size of its field of view, down to the volume of the groove itself which is 10 nL.

Figure 14:
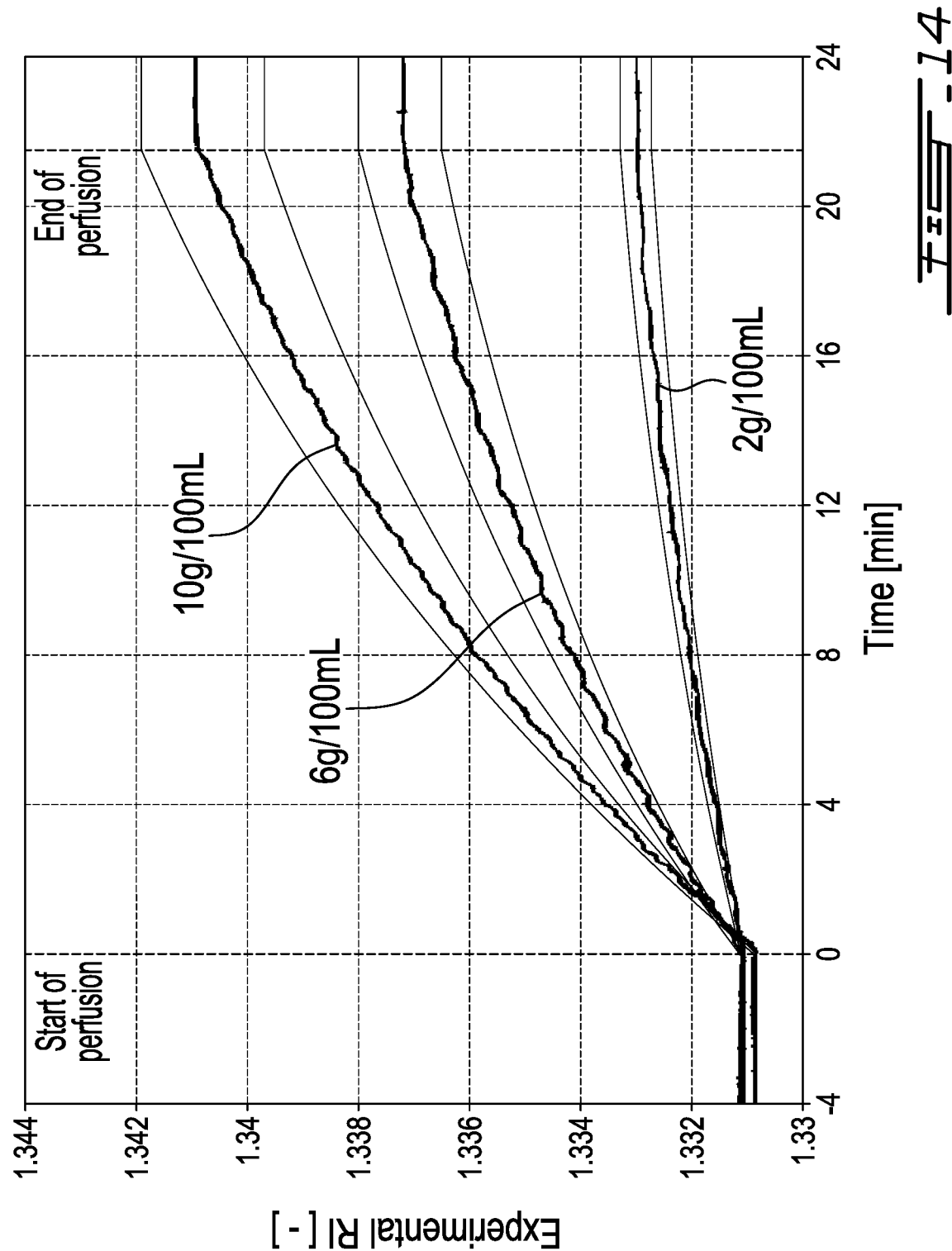
FIG. 14 is a graph showing refractive index as function of time as measured over time using the system of FIG. 12A for different concentrations of medium received on the substrate.

To put into practice the time-resolution capability of the proposed device, the refractive index change was measured over time for three different solutions containing an increasing concentration of Histodenz. The results are shown in FIG. 14 as the three solid lines, where the surrounding colored regions correspond to the refractive index shift predicted by a theoretical model described later. Concretely, a liquid coming from a container was constantly flowing through the proposed imaging chamber. At the beginning of the experiment, in each case, the container was filled with pure distilled water and the proposed device, as can be seen on the first 4 min in FIG. 14 correctly monitored its constant refractive index. Then, a solution containing Histodenz dissolved in distilled water was gradually perfused in this container, in a precisely controlled manner, which gradually increased the refractive index of the flowing solution. About 21 min later, the Histodenz perfusion was stopped, which resulted in a stabilization of the refractive index, as correctly retrieved by the proposed refractometry device. The difference between the three experiments was the concentration of the Histodenz solution perfused, which resulted in different refractive index shifts. The data acquisition and analysis are the same than the ones presented earlier, which means that every data-point forming the curves was calculated from an acquisition of 280 ms, giving a frequency of about 4 Hz.

The theoretical curve describing the refractive index of the mixture in the container over time while one of the Histodenz solution is perfused was determined by solving the differential equation depicting the situation, which is a variant of the well-known mixing problem applied to a refractive index change. The equation is $$n_m(t) = n_{solute} + \Delta n_{solvent}\left[1 - \left(1 - \frac{(Q_{out} - Q_{in})t}{V_0}\right)^{\frac{Q_{out}}{Q_{out} - Q_{in}} - 1}\right], \quad (4)$$

where $\Delta n_{Solvent}$ is the difference in refractive index between the solvent, in this case the Histodenz solution, and the solute in the container, in this case distilled water. $Q_{out}$ is the flow rate of the liquid out of the container and toward the imaging chamber, $Q_{in}$ the flow rate of the Histodenz solution in the container, $V_0$ the volume of distilled water in the container when the Histodenz solution starts perfusing and t the time spent from the beginning of the Histodenz solution perfusion. At the end of the experiment, the refractive index difference between the distilled water and the Histodenz solutions, i.e., $\Delta n_{solvent}$, was determined using the Abbe refractometer to be 0.00302±0.00004, 0.00891±0.00004 and 0.01466±0.00004 for the 2 g/100 mL, 6 g/100 mL and 10 g/100 mL of Histodenz concentration solutions respectively. The flow rate in the chamber was measured to be 0.85 mL/min, the flow rate out of the chamber 0.8±0.2 mL/min and the initial volume 17±1 mL for all experiments, the uncertainty on these values giving the width of the theoretical curves in FIG. 14. With those parameters, the Eq. 2 predicted a final refractive index shift of (0.0019±0.0003), (0.0061±0.0008) and (0.010±0.001) for the 2 g/100 mL, 6 g/100 mL and 10 g/100 mL of Histodenz concentration solutions respectively after a perfusion time of 23 minutes as in FIG. 14.

The measured refractive index shifts are 0.00192, 0.00614 and 0.01013 for the 2 g/100 mL, 6 g/100 mL and 10 g/100 mL of Histodenz concentration solutions respectively, which is in excellent agreement with theoretical curves, and very little noise is perceptible. It is important to note that the small local variations on the experimental refractive index curves do not necessarily reflect errors on the refractive index measurements but can be related to improper mixing of the solution in the container. Still, it was demonstrated in this experiment that the proposed refractometer is clearly capable of measuring the refractive index of an unknown solution at 4 Hz over a long period of time, in this case about 30 minutes, and with a very good precision. In fact, the acquisition rate is camera-limited, so it can be increased at the expense of the refractive index measurement stability, because of the reduced exposure time. At 4 Hz, the stability of the refractive index is better than 0.00002. Even at the maximum frame rate of our camera, which is 164 Hz the stability is still high, at around 0.00007 (data not shown).

Figure 15:
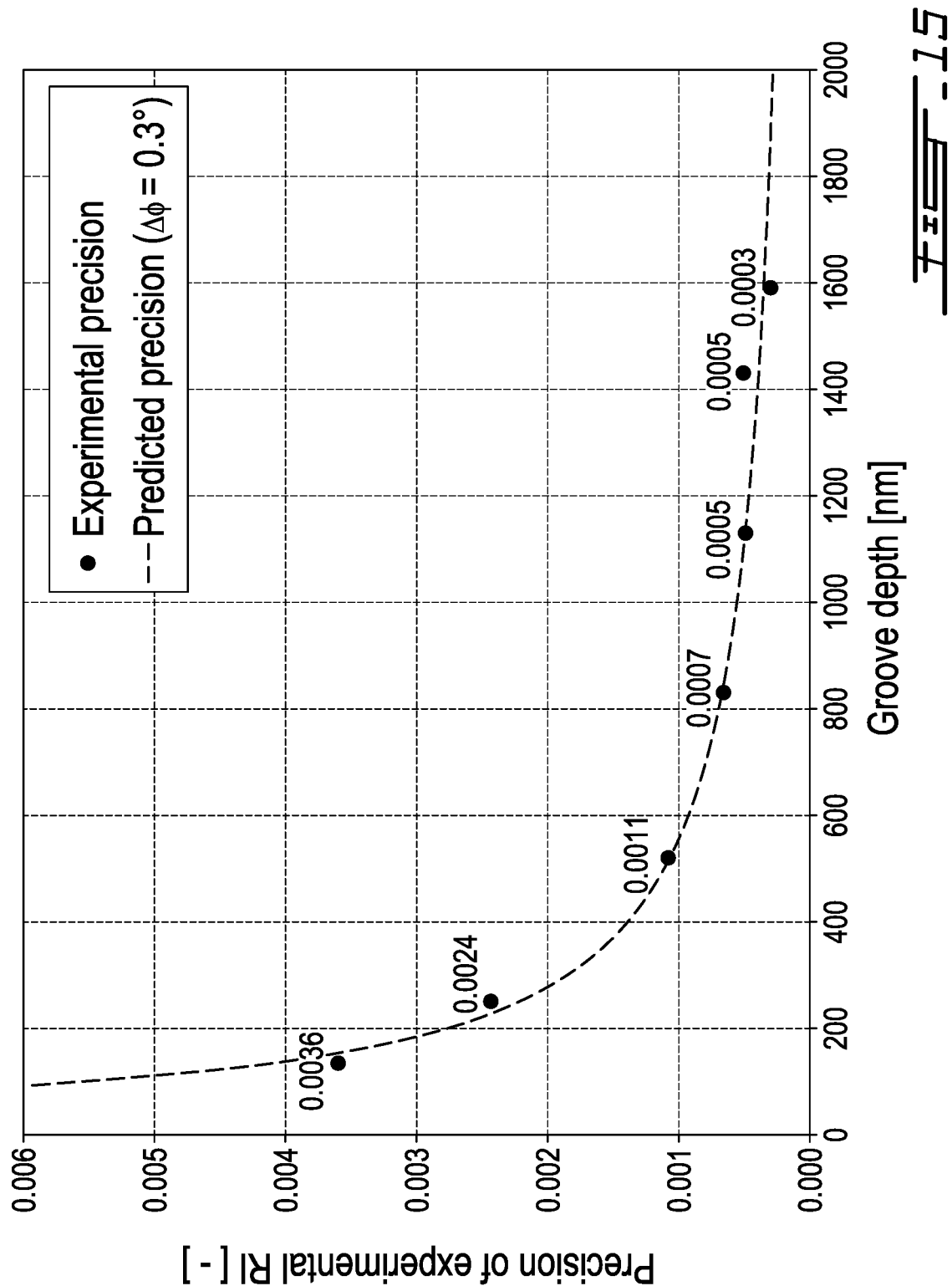
FIG. 15 is a graph showing precision of refractive index measurements as function of depth of the grooves of FIG. 12A.

The precision of the refractometer demonstrated in this paper is in fact limited by our ability to correctly retrieve the QPS imposed by the groove in the quantitative phase image, which depends mostly on the coherent noise. This noise has an error that depend on the refractive index shift between the coverglasses and the liquid, as discussed earlier, but not on the object (in our case, the groove) monitored. By propagating this error in equation (3), assuming that it is our only source of error, the theoretical error on the refractive index $\delta n_m$ can be found to be:

$$\delta n_m = \frac{\delta \Delta \phi \lambda}{360 d'} \quad (5)$$

where $\delta\Delta\phi$ is the noise amplitude, which is 0.3° in the case of distilled water with fused silica coverslips. It can be seen that an increase in the depth of the grooves should increase the precision on the measured refractive index. In fact, this relation has been experimentally verified and the results are shown in FIG. 15. The dotted red line indicates the theoretical behavior predicted by equation (5) and each dot represents the standard deviation over 30 refractive index measurements made on a groove of given depth. A standard deviation was measured on the refractive index of 0.0036, 0.0024, 0.0011, 0.0007, 0.0005, 0.0005 and 0.0003 for groove depths of 135 nm, 250 nm, 520 nm, 830 nm, 1130 nm, 1430 nm and 1589 nm respectively.

It is noted that the depth d can be given by a relation equivalent to the following relation: $d \geq \lambda/1.21$, wherein d denotes the given depth and $\lambda$ denotes the wavelength of the first and second optical beams expressed in nanometers. In such an embodiment, the refractive index can be determinable with a precision of 0.001. This can be supported with the findings of FIG. 15, in which case when the given wavelength is 550 nm, a depth d of about 454 nm yields a precision of about 0.001. In some embodiments, the given depth d is given by a relation equivalent to the following relation: $d \geq \lambda/0.74$, in which case the refractive index may be determinable with a precision of at least 0.0006. Preferably, the given depth d can be given by a relation equivalent to the following relation: $d \geq \lambda/0.41$, in which case the refractive index can be determinable with a precision of at least 0.0003.

Hence, the precision of our refractometry approach can be further improved if deeper grooves are used, which can be easily manufactured using deep RIE technology. However, one should be aware of the possible decrease in the repeatability due to a groove deeper that the depth of focus of the objective used on the digital holographic microscope. The impossibility to have the whole groove in the focal spot of the objective could affect the quantitative nature of the signal and thus the ability to correctly retrieve the QPS of the groove. Objectives with lower NA can then be used to increase the depth of focus, which should not impact the performance of the device whatsoever. In our case, our 20X objective has a depth of focus of about 1600 nm, which is similar than our grooves depth, i.e., 1591 nm. Furthermore, deeper groove can result in wrapped phase signal, which would require the implementation of an unwrapping procedure in order to avoid artefacts in the retrieved QPS. Once again, this should not decrease the performance of the device either.

In conclusion, in this example presents the development and the performance of a new type of interferometry-based refractometer. The proposed refractometer example on a very broad range of wavelength and refractive index with a very small volume of sample liquid and does not require any calibration Relying on a grooved coverglass, the only parameters that need to be well characterised are the depth of the grooves and the refractive index of the coverslip, which are easy to determine with common characterization tools or even by looking in the literature. Furthermore, the groove depth has only to be measured once for a whole generation of coverglasses if the etching parameters are kept the same, as RIE produces very repeatable etching depth. Finally, as it is based on a real time microscopy approach, our refractometer allows for locally resolved measurement with real time visual feedback of the quality of the measurement, which is useful when inhomogeneous liquids are used. An average precision on the measured refractive index was demonstrated to be 0.0003, which is the same as the one of a typical Abbe refractometer. The proposed refractometer also performs particularly well when a refractive index change is characterized. An average precision of 0.00007 on the measure of a refractive index difference was found, as well as time-resolved measurements with a temporal stability better than 0.00002 at 4 Hz. The precision of 0.00007 was easily obtained on an absolute refractive index measurement by using a reference liquid, which places such range of precision of the most precise refractometers available on the market. It can be envisaged that the approach described herein can become a valuable tool in the biological applications of QPI as, for the first time, it allows in situ, timely and locally resolved refractive index measurements, a very important parameter in the interpretation of the retrieved QPS.

In some embodiments, it may be advantageous to use the method, system and substrate described herein in the context high-throughput, high-content screening (HTHC) applications, or in any pharmaceutical contexts. FIG. 16A shows an example of a conventional multiwell plate 1601 having a plurality of wells 1603 recessed therein. Each well 1603 is meant to receive a corresponding one of a plurality of biological samples including cell(s) 1682 and a surrounding medium 1612 for HTHC testing. As well known in this field, reaction(s) of different drugs of different concentrations to one or more biological samples can be advantageously tested all at once.

In these embodiments, it may be convenient to be able to measure a refractive index of the medium 1612 surrounding the cells 1682. As schematically illustrated in FIG. 16B, each of the wells 1603 can have at its bottom a corresponding substrate 1616 having first and second surface portions 1616a and 1616b of different depth d. The cells and medium being receiving on the substrate 1616, as illustrated. In this specific embodiment, the surrounding medium 1612 can be optically interrogated via a microscope objective 1605 of a system, such as the ones described with reference to FIGS. 9-11, with the microscope objective 1605 being positioned at an opening 1607 of the well 1603.

In some embodiments, one or more coating layers 1609 can be deposited on the substrate 1614. In these embodiments, the medium 1612 can be indirectly received on the substrate 1614 via the coating layer(s) 1609. In embodiments where the medium 1612 includes cells(s) 1682, the coating layer(s) 1609 can be made of a biologically-compatible coating material. Examples of coating material may include, but are not limited to, poly-d-lysine (PDL), poly-1-ornithine (PLO), poly-1-lysine (PLL), laminin, collagen type 4, collagen type 1, fibronectin, matrigel, or any combination thereof. In an experiment, it was found that the deposition of such coating layer(s) 1609 on the substrate 1614 does not undesirably fill the given depth d extending between the first and second surface portions 1616a and 1616b of the first surface 1616 of the substrate 1614. In other words, the depth d of the grooves engraved in a surface of a substrate could still be measured or otherwise appreciated even in the presence of the coating layer(s) 1609. Moreover, the measured depth d was found to be substantially similar with or without the coating layer(s) 1609. It is noted that although the embodiment shown in FIG. 16B shows that the optical beams are reflected back from the substrate 1614 as in the reflection configuration of FIG. 5, the optical beams could as well be propagated through the substrate 1614 and through the well bottom in a transmission configuration such as in FIGS. 5 and 6 in some other embodiments.

FIG. 17 shows another example of a flow chamber having a substrate 1714 with grooves 1770 and a microfluidic plate with microfluidic channels 1711 recessed therein. As shown in this embodiment, the substrate 1714 and the microfluidic plate are superposed to one another in a stacked format. However, in some other embodiments, the substrate 1714 and the microfluidic plate can be made monolithically made integral to one another. In this specific example, a given biological sample 1712 can be received on the substrate 1714. By flowing different drug compositions of different concentrations into the microfluidic channels 1711, the reaction of the biological sample 1712 can be monitored in a spatially-resolved manner over time. For instance, it may be determined that a given one of the drug compositions and/or concentrations reacts satisfactorily with the biological sample 1712. During which, local refractive indexes of the surrounding medium can be measured via the presence of the grooves 1770 using methods and systems described herein.

As can be understood, the examples described above and illustrated are intended to be exemplary only. For instance, although the expression "wavelength" has been used throughout this disclosure, it is intended that this expression can be interpreted as encompassing the expression "frequency," which can characterize the first and second optical beams in an equivalent manner. It is noted that even though the systems described can be advantageously used concurrently with DHM systems, the systems described herein can be used as standalone systems as well. Further, although the measurement of the refractive index of the medium can be used to enhance the quantitative aspect and accuracy of subsequent measurement of the refractive index of living cells adjacent to the medium, it is intended that the measurement of the refractive index of the medium can also be used to enhance the quantitative aspect and accuracy of subsequent measurement of the refractive index of non-living samples adjacent to the medium. Examples of such non-living samples can include solids such as metals, plastics, dielectrics, semiconductors, components such as microelectromechanical systems (MEMS), micro-lenses, micro-optical elements, and the like. Indeed, measuring the refractive index of a medium surrounding a living or non-living sample is useful not only in life sciences but also in industrial applications such as in material characterization and/or processing. In these cases, when the refractive index of the non-living sample is known, quantitative phase measurements of the depth or of the height of the non-living sample surrounded by the medium can be quantitatively enhanced using the prior measurements of the refractive index of the medium, and vice versa. Although in this example the first surface of the substrate is planar, the first surface of the substrate can be curved in some other embodiments. In these embodiments, the determination of the refractive index of the medium could involve other equations than equations (1) and (2) already discussed above. For instance, the other equations may involve a known varying, complex shape or geometry of the substrate which receives the medium. It is encompassed that some embodiments could have the first and second optical beams propagated in opposite directions from one another as they propagate across the substrate. The scope is indicated by the appended claims.

What is claimed is:

1. A method for determining refractive indexes in an inhomogeneous medium, the method comprising:
providing a substrate having a first surface opposite to a second surface, the first surface having first surface portions and second surface portions, the second surface portions being interspersed between the first surface portions, the second surface portions recessed of a respective depth relative to an adjoining one of the first surface portions;

receiving the inhomogeneous medium at least on the second surface portions;

propagating a first optical beam towards the first surface portion adjoining a corresponding second surface portion and a second optical beam towards the corresponding second surface portion, the first and second optical beams having power within a spectral band at a given wavelength;

collecting the first and second optical beams after said propagating and generating first and second signals being indicative of a phase of a respective one of the first and second collected optical beams; and determining a refractive index of said inhomogeneous medium at the corresponding second surface portion based on the first and second signals, the respective depth, the given wavelength and a refractive index of the substrate; and associating the refractive index of said inhomogeneous medium at the corresponding second surface portion to a coordinate indicative of a position of the corresponding second surface portion;

performing said propagating, collecting, determining and associating for other ones of the second surface portions; and outputting the refractive indexes of the inhomogeneous medium and the associated coordinates.

2. The method of claim 1 wherein the inhomogeneous medium surrounds a biological sample received on the first surface of the substrate, the method further comprising determining at least one of a given refractive index of the biological sample and a given geometry of the biological sample based on the previously determined refractive index of the inhomogeneous medium at a coordinate close to the biological sample.

3. The method of claim 2 further comprising depositing a coating layer on the first surface of the substrate, the coating layer being made of a biologically-compatible material, the biological sample being indirectly received on the first surface of the substrate via the coating layer.

4. The method of claim 1 wherein the first and second optical beams are portions of a same optical beam.

5. The method of claim 1 wherein said first and second optical beams are propagated through the substrate prior to said collecting.

6. The method of claim 1 wherein the first and second optical beams are in phase relative to one another prior to reaching said substrate.

7. The method of claim 1 wherein the first and second optical beams are orthogonal to the substrate.

8. The method of claim 1 wherein said collecting further comprises collecting a reference beam simultaneously to said first and second optical beams, said first and second signals each being indicative of an intensity of an interference between the reference beam and a respective one of the first and second collected optical beams at corresponding ones of the detectors of the array.

9. The method of claim 1 wherein said inhomogeneous medium is a fluid medium of varying concentration, said receiving comprising flowing said inhomogeneous medium of varying concentration on the first surface while executing said performing, thereby monitoring the refractive index varying over time at a given one of the coordinates.

10. The method of claim 1 further comprising characterizing a biological sample received on the first surface based on the refractive index associated to a coordinate of one of the second surface portions where the biological sample is received.

11. The method of claim 1 wherein said second surface portions have different depths relative to adjoining ones of the first surface portions.

12. A system for determining refractive indexes in an inhomogeneous medium, the system comprising:

a substrate having a first surface opposite to a second surface, the first surface having first surface portions and second surface portions, the second surface portions being interspersed between the first surface portions, the second surface portions recessed of a respective depth relative to an adjoining one of the first surface portions and receiving the inhomogeneous medium;

an optical source propagating a first optical beam towards the first surface portions, and a second optical beam towards the second surface portions, the first and second optical beams having power within a spectral band at a given wavelength;

a detector collecting the first and second optical beams after said propagating and generating first and second signals being indicative of a phase of a respective one of the first and second collected optical beams; and a computer configured for performing the steps of: determining a refractive index of said inhomogeneous medium based on the first and second signals, the respective depth, the given wavelength and a refractive index of the substrate; associating the refractive index of said inhomogeneous medium at the corresponding second surface portion to a corresponding coordinate indicative of a position of the corresponding second surface portion; performing said propagating, collecting, determining and associating for other ones of the second surface portions and outputting the refractive indexes of the inhomogeneous medium and the associated coordinates.

13. The system of claim 12 wherein the substrate is a coverslip, the second surface portion being recessed from an original surface of the coverslip.

14. The system of claim 12 further comprising an enclosure having an optically transparent base, a plurality of lateral walls extending from the optically transparent base towards an optically transparent top, and a sealed cavity within the enclosure, the inhomogeneous medium being received in the cavity, the substrate being made integral to at least one of the optically transparent base and the optically transparent top of the enclosure, the second surface portions facing towards the sealed cavity.

15. The system of claim 14 wherein the enclosure has an input port and an output port, the system further comprises a pump flowing the inhomogeneous medium into and out of the cavity via said input and output ports.

16. The system of claim 12 wherein the system is provided in the form of a digital holographic microscopy system.

* * * * *